United States Patent [19]
Mozaffar et al.

[11] Patent Number: 6,045,842
[45] Date of Patent: *Apr. 4, 2000

[54] HIGH THROUGHPUT DEBITTERING

[75] Inventors: Zahid Mozaffar, Union City; Quirinus Ronnie Miranda, San Jose; Vinit Saxena, Pleasanton, all of Calif.

[73] Assignee: Sepragen Corporation, Calif.

[ * ] Notice: This patent is subject to a terminal disclaimer.

[21] Appl. No.: 09/110,492

[22] Filed: Jul. 6, 1998

Related U.S. Application Data

[63] Continuation-in-part of application No. 08/702,760, Aug. 22, 1996, Pat. No. 5,817,354.

[51] Int. Cl.[7] .................. A23L 2/80; C02F 1/42
[52] U.S. Cl. .......... 426/271; 426/422; 426/424; 426/490; 426/599; 426/616; 426/650; 210/198.2; 210/502.1; 210/656
[58] Field of Search .............. 426/271, 422, 426/424, 490, 599, 616, 650; 210/198.2, 502.1, 656

[56] References Cited

U.S. PATENT DOCUMENTS

| | | | |
|---|---|---|---|
| 2,510,797 | 6/1950 | Burdick et al. | 99/105 |
| 2,681,907 | 6/1954 | Wender | 260/210 |
| 3,422,605 | 1/1969 | Crowley | 55/386 |
| 3,453,811 | 7/1969 | Crowley | 55/386 |
| 3,463,763 | 8/1969 | Griffiths | 260/78 |
| 3,780,866 | 12/1973 | Ek et al. | 210/198 |
| 3,989,854 | 11/1976 | Chandler et al. | 426/422 |
| 4,133,562 | 1/1979 | Andren | 285/187 |
| 4,154,862 | 5/1979 | Guadagni et al. | 426/536 |
| 4,297,220 | 10/1981 | Meitzner et al. | 210/690 |
| 4,354,932 | 10/1982 | McNeil | 210/198.2 |
| 4,439,458 | 3/1984 | Puri | 426/330 |
| 4,514,427 | 4/1985 | Mitchell et al. | 426/271 |
| 4,627,918 | 12/1986 | Saxena | 210/656 |
| 4,676,898 | 6/1987 | Saxena | 210/198.2 |
| 4,865,729 | 9/1989 | Saxena et al. | 210/658 |
| 5,452,659 | 9/1995 | Pupic | 101/415.1 |

FOREIGN PATENT DOCUMENTS 2125539 2/1972 France .

OTHER PUBLICATIONS

Norman and Kimball, "A Commercial Citrus Debittering System," *Trans. Citrus Engineer. Conf. ASME* 36:1–31 [1990].

Maier et al., "Limonin and Other Limonoids," in *Citrus Science and Technology*, S. Nagy et al. (eds.), AVI Publishing Co., Westport, CN, 1:355–396 [1977].

Maier et al., "Limonin and Limonoids," *Citrus Nutr. Qual.* 143:63–82 [1980].

Rouseff, "Nomilin, a New Bitter Component in Grapefruit Juice," *J. Agricult. Food Chem.* 30:504–507 [1982].

Rouseff, "Flavonoids and Citrus Quality," in *Citrus Nutrition and Quality* (S. Nagy and J.A. Attaway, eds.), ACS Symposium Series 143:63–65 [1980].

(List continued on next page.)

*Primary Examiner*—Helen Pratt
*Attorney, Agent, or Firm*—Medlen & Carroll, LLP

[57] ABSTRACT

The present invention relates to methods and materials for use in processing citrus products, and more particularly, the debittering and/or deacidifying of juices. In one preferred embodiment, the citrus juice debittered and/or deacidified by the present invention is grapefruit, while in an alternative embodiment, the citrus juice debittered and/or deacidified is orange juice. The methods allow for high flow rates which, in turn offer advantages associated with permitting high throughput of juice to be treated.

28 Claims, 13 Drawing Sheets

OTHER PUBLICATIONS

Albach et al., "Limonin Content of Juice from Marrs and Hamlin Oranges [*Citrus sinensis* (L.) Osbeck]," *J. Agric. Food Chem.* 29:313–315 [1981].

Maier et al., "Development of Methods for Producing Nonbitter Navel Orange Juice," *Citrograph* 56:373–375 [1971].

Tatum and Berry, "Method for Estimating Limonin Content of Ctirus Juices," *J. Food Sci.* 38:1244–1246 [1973].

McColloch, "Preliminary Studies on Debittering Navel Orange Products," *Calif. Citrograph* 35:290–292 [1950].

Chandler et al., "Removal of Limonin From Bitter Orange Juice," *J. Food Agricult.* 19:83–86 [1968].

Nisperos and Robertson, "Removal of Naringin and Limonin from Grapefruit Juice using Polyvinylpyrrolidone," *Philip Agriculture* 65:275–282 [1982].

Chandler and Johnson, "Cellulose Acetate as a Selective Sorbent for Limonin in Orange Juice," *J. Sci. Food Agricult.* 28:875–884 [1977].

Barmore et al., "Reduction of Bitterness and Tartness in Grapefruit Juice with Florisil," *J. Food Sci.* 512:415–417 [1986].

Shaw and Buslig, "Selective Removal of Bitter Compounds from Grapefruit Juice and from Aqueous Solution with Cyclodextrin Polymers and with amberlite XAD–4," *J. Agricult. Food Chem.* 34:837–840 [1986].

Gage et al., "The Use of Ion Exchange Resins with Flavonoid Compounds," *Science* 113:522–523 [1951].

Couture and Rouseff, "Debittering and Deacidifying Sour Orange (*Citrus aurantium*) Juice Using Neutral and Anion Exchange Resins," *J. Food Sci.* 57:380–384 [1992].

Hernandez et al., "Evaluation of Ultrafiltration and Adsorption to Debitter Grapefruit and Grapefruit Pulp Wash," *J. Food Sci.* 57:664–670 [1992].

Wethern, "Citrus Debittering with Ultrafiltration/Adsorption Combined Technology," *Trans. Citrus Engineer. Conf. ASME* 37:48–66 [1991].

Kimball, "Debittering of Citrus Juices Using Supercritical Carbon Dioxide," *J. Food Sci.* 52:481–482 [1987].

Ono et al., "Preparation and Properties of Naringinase Immobilized by Ionic Binding to DEAE–Sephadex," *J. Ferment. Technol.* 55:493–500 [1977].

Olson et al., "Naringin Bitterness of Grapefruit Juice Debittered with Naringinase Immobilized in a Hollow FIber," *J. Food Sci.* 44:1358–1361 [1979].

Gray and Olson, "Hydrolysis of High Levels of Naringin in Grapefruit Juice Using a Hollow Fiber Naringinase Reactor," *J. Agricult. Food Chem.* 29:1298–1301 [1981].

Hasegawa, "Limonoid Debittering of Citrus Juice Using Immobilized Bacterial Cell Systems," *Food Biotechnol.* 1:249–261 [1987].

Kealey and Kinsella, "Orange Juice Quality with an Emphasis on Flavor Components," in *Critical Reviews in Food Science & Nutrition*, 11:1–40 [1979].

Berry, "Recent Developments in Citrus Processing, Products and Specialty Products," *Proc. Intr. Soc. Citriculture* 2:896–899 [1981].

Johnson and Chandler, "Ion Exchange and Adsorbent Resins for Removal of Acids and Bitter Principles from Citrus Juices," *J. Sci. Food Agricult.*, 36:480–484 [1985].

Johnson and Chandler, "Adsorptive Removal of Bitter Principles and Titratable Acid from Citrus Juices," *Food Technol.* 42:130–137 [1988].

Matthews et al., "Removal of Limonin and Naringin from Citrus Juice by Styrene–Divinylbenzene Resins," *Food Technol.* 44:130–132 [1990].

Manlan et al., "Evaluation of the Properties of Polystyrene Divinylbenzene Adsorbents for Debittering Grapefruit Juice," *Journal of Food and Science* 55(2):440–445 [1990].

Hendrickson et al., "Ultraviolet Absorption Technique to Determine the Naringin Content of Grapefruit Juice," *Proc. Florida Hort. Soc.* 71:194–198 [1958].

Plummer, *An Introduction to Practice Biochemistry*, McGraw–Hill Book Co., UK, pp. 318–319 [1978].

Shaw and Wilson, "A Rapid Method for Determination of Limonin in Citrus Juices by High Performance Liquid Chromatography," *J. Food Sci.* 49:1216–1218 (1984).

Manthey and Grohmann, "Concentrations of Hesperidin and Other Orange Peel Flavonoids in Citrus Processing Byproducts," *J. Agric. Food Chem.* 44:811–814 (1996).

Widmer and Martin, "Analysis of Limonin in Citrus Juices by Direct Injection and On–Line Sample Clean–Up," *Forty–Fifth Annual Citrus Processors' Meeting*, Oct. 12, 1994, (State of Florida—Department of Citrus: Lakeland, Florida and Citrus Research and Education Center: Lake Alfred, Florida, pp. 21–24).

Rouseff et al., "New HPLC Determination of Citrus Carotenoids Employing a C–30 Reverse Phase Column and Photodiode Array Detection," *Forty–Fifth Annual Citrus Processors' Meeting*, Oct. 12, 1994, (State of Florida—Department of Citrus: Lakeland, Florida and Citrus Research and Education Center: Lake Alfred, Florida, pp. 15–19).

After the debittering process the column
was washed with water (2 BV)

↓

Bitter compounds eluted with 95% ethanol (2 BV)

↓

Water wash (2 BV)

↓

Flavor components eluted with 0.5 M NaOH (2 BV)

↓

Water wash (2 BV)

↓ pH – exchange with 0.2 M HCl (2 BV)

↓

Water wash (5 BV)

↓

Column cleaned and regenerated for next cycle

Figure 13

HIGH THROUGHPUT DEBITTERING

The present invention is a Continuation-in-Part of U.S. patent application Ser. No. 08/702,760, filed Aug. 22, 1996 now U.S. Pat. No. 5,817,354.

FIELD OF THE INVENTION

The present invention is related to the processing of citrus products, and more particularly, the removal of bitterness and/or acid from juices and other fluids.

BACKGROUND OF THE INVENTION

Many factors influence the quality of citrus products, including juices. To consumers, taste, flavor, acidity, bitterness or tartness, color, and texture are important considerations for acceptance of these products. Indeed, consumer acceptance is a critical factor to the citrus industry. This is of particular importance in view of the world market for citrus products. For example, the world production of orange juice has reached an excess of 900 million single strength gallons (see, S. I. Norman and D. A. Kimball, Trans. Citrus Engineer. Conf., ASME 36:1–31 [1990]), and for grapefruit juice, the annual consumption is approximately 100 million single strength gallons (see, S. I. Norman and D. A. Kimball, Trans. Citrus Engineer. Conf., ASME 36:1–31 [1990]). As discussed below, the principal bitterness compounds in grapefruit and orange juices are naringin and limonin, respectively. The predominant acid which is perceived as the tartness of the citrus juice is citric acid (Charles et al., Food Sci., 51:415 [1986]). Sensory properties of the sour orange (*Citrus aurantium*) juice are extremely different from those of sweet orange juice (Couture and Rouseff, J. Food Sc., 57:380 [1992]). The sourness of sour oranges is due to an elevated acidity, especially in comparison with sweet oranges. It has been reported that excessive acidity reduces the consumer acceptance of grapefruit juice (See, Johnson and Chandler, Food Technol., May, 1988, pp. 130–137). Thus, sour orange juice and grapefruit juice are viewed as less commercially important than sweet juice.

Bitterness in citrus juice products (e.g., orange and grapefruit juices) has been a long-standing consumer acceptance problem in the industry. The presence of bitterness in citrus fruit juices has resulted in attempts to limit or avoid the development of bitterness in the fruit used to produce juice. For example, because of the development of bitter taste that occurs in early to mid-season oranges and early season grapefruits, these fruits are rarely used in the production of juice. Thus, the presence of bitterness represents a significant loss in the amount of fruit available and suitable for use by the juice industry. In order to permit the use of early to midseason fruits, as well as fruit varieties that naturally are more bitter than others, much research has been conducted to identify the chemical compounds responsible for the bitterness of citrus juices. This research has identified two major classes of compounds responsible for the bitterness of citrus juices, namely the limonoids and flavonoids.

Liminoids

The limonoids comprise a class of chemical compounds widely distributed in all citrus species (V. P. Maier et al, in *Citrus Science and Technology*, S. Nagy et al. (eds.), AVI Publishing Co., Westport, Conn., 1:355–396 [1977]; and V. P. Maier et al., Citrus Nutr. Qual., 143:63–82 [1980]). The most important limonoid compound, limonin, is an intensely bitter compound that is of commercial significance in the citrus industry, as even low concentrations of this compound (e.g., 6 parts per million) may cause significant reductions in juice quality.

Limonin is a highly oxygenated triterpene dilactone, with the chemical formula $C_{26}H_{30}O_8$, and a molecular weight of approximately 470, and a volume of approximately 402 cubic angstroms. As shown in FIG. 1, limonin includes an epoxide, two lactone rings, a five-membered ether ring, and a furan ring. All other citrus limonoids have been reported to have the furan ring and at least one of the lactone rings (V. P. Maier et al., supra). Limonin is only slightly soluble in water and alcohol, although its water solubility is increased in the presence of sugar and pectin. It is soluble in glacial acetic acid, acetonitrile, and chloroform.

Limonin is produced as an esterification product of limonoic acid A-ring lactone. During extraction of citrus juice from fruit, this non-bitter lactone compound undergoes an enzyme-induced, acid-catalyzed, esterification to form the bitter compound known as limonin. During pasteurization and/or evaporation of the juice, heat catalyzes the esterification reaction. This production of limonin from limonoic acid A-ring lactone is often referred to as "delayed bitterness."

In addition to limonin, another limonoid known as "nomilin" has also been associated with delayed bitterness (see e.g., R. L. Rouseff, J. Agricult. Food Chem., 30:504–507 [1982]). However, it is usually present in much lower concentrations (e.g., <2 ppm) in citrus juice. Thus, it is of less commercial significance than limonin (S. I. Norman and D. A. Kimball, Trans. Citrus Engineer. Conf., ASME 36:1–31 [1990]).

Flavonoids

Flavonoids are chemicals that, like the limonoids, are widely distributed throughout the higher plant kingdom. There are two flavonoids (hesperidin and naringin) of particular importance as quality indicators for the citrus industry. For example, if it is present in citrus juice, hesperidin precipitate results in lower juice quality (see e.g., Norman and Kimball, supra). In addition, high concentrations of naringin also reduce juice quality (see e.g., Norman and Kimball, supra). The highest concentrations of naringin are found in the albedo portion of the citrus fruit, while the highest concentrations of limonin are found in the seeds and rag.

Naringin, with a molecular weight of approximately 580, an approximate volume of 465 cubic angstroms, and chemical formula $C_{27}H_{32}O_{14}$, is composed of one flavonoid group attached to a disaccharide (glucose-rhamnose). The structure of naringin is shown in FIG. 2. If the rhamnose is attached at the C-7 position of the flavonoid, the compound is bitter. However, if the rhamnose is attached to the C-2 position of the flavonoid, the compound is tasteless (R. L. Rouseff, in "*Citrus Nutrition and Quality* (S. Nagy and J. A. Attaway, eds.), ACS Symposium Series 143:63–65 [1980]). Thus, much research has been conducted regarding the various forms and isomers of the flavanones (see e.g., R. L. Rouseff, supra). While naringin is only slightly soluble in water, it is soluble in acetone, alcohol, and warm acetic acid.

Debittering of Juice

Both pre-harvest and processing methods have been investigated for reducing the bitterness of citrus fruit, as well as methods for debittering harvested juice, in order to improve the flavor and enhance the commercial value of the juice. The use of plant growth regulators, rootstocks and other horticultural factors (see e.g., R. F. Albach et al., J. Agric. Food Chem., 29:313–315 [1981], as well as post-harvest fruit treatment with ethylene (V. P. Maier et al., Citrograph 56:373–375 [1971], and the use of low pressures during juice extraction to prevent albedo disruption (J. H. Tatum and R. E. Berry, J. Food Sci., 38:1244–1246 [1973] have been studied as methods to control bitterness.

Adsorbents and ion-exchange resins have also been used. For example, activated carbon has been used to debitter orange juice. (See e.g., R. J. McColloch, Calif. Citrograph 35:290–292 [1950]; and U.S. Pat. No. 2,510,797). Polyamides have also been used (see e.g., B. V. Chandler et al., J. Food Agricult., 19:83–86 [1968]; and M. O. Nisperos and G. L. Robertson, Philip Agriculture 65:275–282 [1982]). Other adsorptive agents have also been used with varying success to debitter citrus juices, including cellulose acetate (B. V. Chandler and R. L. Johnson, J. Sci. Food Agricult., 28:875–884 [1977], cellulose esters (B. V. Chandler and R. L. Johnson, U.S. Pat. No. 3,989,854); Florisil (C. R. Barmore et al., J. Food Sci., 512:415–416 [1986], cyclodextrin polymers (P. E. Shaw and B. S. Buslig, J. Agricult. Food Chem., 34:837–840 [1986], ion exchange resins (see e.g., Kunin U.S. Pat. No. 2,681,907; Gage et al., Science 113:522–523 [1951]; and R. Couture and R. Rouseff J. Food Sci., 57:380–384 [1992], including polyhexamethylene adipamide and polyvinylpyrrolidone (U.S. Pat. No. 3,463,763), and styrene divinyl-benzene (SDVB) cross-linked copolymer resin (e.g., Mitchell and Pearce, U.S. Pat. No. 4,439, 458).

Other methods to debitter citrus juices have included the use of ultrafiltration and adsorption (E. Hernandez et al., J. Food Sci., 57:664–670 [1992]; and M. Wethern, Trans. Citrus Engineer. Conf., ASME 37:48–66 [1991], supercritical carbon dioxide (D. A. Kimball, J. Food Sci., 52:481–482 [1987]), immobilized enzymes (D. Dinelli and F. Morisi, French Patent No. 2,125,539; M. On et al., J. Ferment. Technol., 55:493–500 [1977]; A. C. Olson et al., J. Food Sci., 44:1538–1361 [1979]; and M. C. Gray and A. C. Olson, J. Agricult. Food Chem., 29:1298–1302 [1981], immobilized microorganisms (S. Hasegawa, Food Biotechnol., 1:249–261 [1987], and the use of bitterness modulators (e.g., neodiosmin) (D. G. Guadagni et al., U.S. Pat. No. 4,154,862 [1977]). The use of cellulose esters has been successful in the partial removal of flavonoids (e.g., K. S. Kealey and J. E. Kinsella, in "Critical Reviews in Food Science & Nutrition," 11:1–40 [1979]).

However, despite the large number of methods studied to remove bitterness from citrus juices, all of the previously reported methods have serious limitations. For example, carbon adsorbents are non-specific and consequently remove other components present in the juice (R. E. Berry, Proc. Intr. Soc. Citriculture, pp. 896–899 [1981]). The use of polyamides has a major drawback in that it results in the substantial loss of ascorbic acid from orange juice. In addition, the use of polyamides requires a two-stage treatment of the juice, due to the preferential adsorption of phenolic compounds by polyamines. Thus, this method is not economically viable. The methods involving the use of immobilized enzymes have been hampered by the unavailability of commercial quantities of purified enzymes, low reaction rates associated with immobilized enzymes, and the inadequate half lives of the immobilized enzymes. Methods using immobilized microorganisms also suffer from practical problems.

Thus, there remains a need in the art for debittering and deacidification methods that are economical, efficient, and utilizes materials approved by governmental agencies for food processing (e.g., the Food and Drug Administration [FDA]).

SUMMARY OF THE INVENTION

The present invention is directed to the processing of citrus products, and more particularly, improved methods, compositions, and devices for the debittering of juices and other liquids and fluids. In particular, the present invention is intended for use with citrus juices for the removal of compounds that cause bitterness. While the mechanism by which such compounds are removed or the precise nature of the compounds to be removed is not necessary for successful use of the invention, it is believed that the present invention removes such compounds as limonoids and flavonoids. Thus, use of the present invention is not intended to be limited to removal of limonin and/or naringin, or to be dependent upon the precise nature of the compounds removed. In one particularly preferred embodiment, the present invention is used for the debittering of orange and grapefruit juices. However, it is contemplated that the methods of the present invention will also be useful for debittering other citrus juices, such as lemon, lime, tangerine, tangelo, mandarin oranges, and others, as well as other fruit and vegetable juices.

In one embodiment, the present invention provides methods for debittering fluid comprising the steps of: a) providing a fluid suspected of containing one or more bitterness compounds, and styrene-divinyl-benzene resin, wherein the resin is comprised of particles of about 100–200 microns in size; and b) contacting the styrene-divinyl-benzene resin with the fluid. In one embodiment of these methods, the contacting is conducted under conditions in which one or more bitterness compounds is substantially removed from the fluid. In a preferred embodiment, the styrene-divinylbenzene resin is AMBERLITE® XAD-16. In one embodiment, the bitterness compound tested in these methods is selected from the group consisting of limonin and naringin. In one preferred embodiment, the resin is contained within a radial flow column. In an alternative embodiment, the methods further comprise the step of collecting the one or more bitterness compounds removed or eluted from the resin. In a particularly preferred embodiment, the fluid is citrus juice. It is contemplated that the citrus juice used in the method of the present invention be selected from the group consisting of grapefruit juice, orange juice, tangerine juice, lemon juice, and lime juice.

In an alternative embodiment, the present invention provides methods for debittering juice comprising the steps of: a) providing a juice suspected of containing one or more bitterness compounds, and styrene-divinyl-benzene resin, wherein the resin is comprised of particles of about 100–200 microns; and b) contacting the juice to the styrene-divinyl-benzene resin, under conditions such that one or more bitterness compound binds to the styrene-divinyl-benzene resin. In one embodiment, the one or more bitterness compounds binding to the styrene-divinyl-benzene resin is selected from the group comprising limonin and naringin. In a preferred embodiment the juice is citrus juice, including, but not limited, to juices such as orange juice, grapefruit juice, lemon juice, tangerine juice, and lime juice.

In yet another alternative embodiment, the present invention provides methods for debittering citrus juice comprising the steps of: a) providing citrus juice suspected of containing one or more bitterness compounds, and styrene-divinylbenzene resin, wherein the resin is comprised of particles of about 100–200 microns; and b) contacting the citrus juice with styrene-divinyl-benzene resin, under conditions such that one or more bitterness compound binds to the styrenedivinyl-benzene resin. In one preferred embodiment, the styrene-divinyl-benzene resin is AMBERLITE® XAD-16. In one embodiment of this method, the bitterness compound is selected from the group consisting of limonin and naringin. In a preferred embodiment, the resin is contained within a radial flow column. In one preferred embodiment, the method further comprises the step of eluting one or more bitterness compounds from the resin. In a particularly preferred embodiment, the exposing of the citrus juice to the resin is conducted at a flow rate of greater than or equal to 0.15 bed volumes per minute. In an alternative preferred embodiment, the flow rate is 2 bed volumes per minute.

The present invention also provides a device for debittering fluid, comprising a container having a resin chamber, an opening in the resin chamber, an exit from the resin chamber, and a styrene-divinyl-benzene resin contained within the resin chamber, wherein the styrene-divinyl-benzene resin is comprised of particles of approximately 100 to 100 microns in size. In a preferred embodiment, the column of the device is a radial flow column. In an alternative embodiment, the column of the device is an axial flow column. In a particularly preferred embodiment, the styrene-divinyl-benzene resin contained within the device is AMBERLITE® XAD-16. In yet another embodiment, the device further comprises a means to pump fluid though the styrene-divinyl-benzene resin contained within the resin chamber.

The present invention also provides a composition comprising an SVDB resin having a particle size of approximately 100–200 microns. In one embodiment of the composition, the SVDB is AMBERLITE® XAD-16.

The present invention also provides methods for isolating flavor compounds from a fluid, comprising the steps of providing i) a fluid suspected of containing one or more flavor compounds, and ii) an adsorbent styrene-divinyl-benzene resin, wherein the adsorbent styrene-divinyl-benzene resin is comprised of particles of about 100–200 microns; and b) contacting the adsorbent styrene-divinyl-benzene resin with the fluid. In some embodiments of the methods, the contacting is conducted under conditions in which the one or more flavor compounds is substantially removed from the fluid. In alternative embodiments of the methods, the adsorbent styrene-divinyl-benzene resin comprises a non-ionic, hydrophobic, cross-linked resin. In yet other embodiments, the flavor compound is citrus flavor.

The present invention further provides methods for the debittering and isolating flavor compounds from a fluid comprising the steps of a) providing: i) a fluid suspected of containing one or more bitterness compounds and flavor compounds, and ii) an adsorbent styrene-divinyl-benzene resin, wherein the adsorbent styrene-divinyl-benzene resin is comprised of particles of about 100–200 microns; b) contacting the adsorbent styrene-divinyl-benzene resin with the fluid, under conditions such that the bitterness compounds and the flavor compounds adsorb to the styrene-divinyl-benzene resin; c) eluting the bitterness compounds adsorbed to the styrene-divinyl-benzene resin with a buffer; and d) eluting the flavor compounds adsorbed to the styrene-divinyl-benzene resin with a buffer.

In some methods of the present invention, the method further comprises the step of collecting the eluted bitterness compounds. In yet other embodiments, the method further comprises collecting the eluted flavor compounds. In still other embodiments, the method further comprises collecting the eluted bitterness compounds as well as the eluted flavor compounds. In some embodiments of the methods, the bitterness compounds are eluted from the styrene-divinyl-benzene resin using a buffer comprising ethanol. In some embodiments of these methods, the ethanol is removed from the bitterness compounds, to produce recovered ethanol. In some preferred embodiments, the recovered ethanol is suitable for use as a buffer. In yet other preferred embodiments, the flavor compounds are eluted from the styrene-divinyl-benzene resin using a buffer comprising sodium hydroxide. The present invention also provides flavor compounds prepared according to these methods, as well as bitterness compounds prepared according to these methods.

The present invention further provides methods for debittering and deacidifying a fluid comprising the steps of: providing: i) a fluid suspected of containing one or more bitterness compounds, one or more acid compounds, ii) an adsorbent styrene-divinyl-benzene resin, wherein the adsorbent styrene-divinyl-benzene resin is comprised of particles of about 100–200 microns, and iii) an anion exchange resin; b) contacting the adsorbent styrene-divinyl-benzene resin with the fluid under conditions such that the one or more bitterness compounds adsorb the adsorbent styrene-divinyl-benzene resin, and the one or more acid compounds pass through the adsorbent styrene-divinyl-benzene resin to produce a debittered fluid; c) contacting the debittered fluid with the macroporous anion exchange resin under conditions such that the one or more acid compounds adsorb to the anion exchange resin to produce a debittered and deacidified fluid.

In some embodiments of these methods, the one or more bitterness compounds adsorbed to the adsorbent styrene-divinyl-benzene resin are eluted. In yet other embodiments, the one or more acid compounds are adsorbed to anion exchange resin are eluted. In still other embodiments, the anion exchange resin comprises a macroporous anion exchange resin having secondary amine functionality and a cross-linked formaldehyde matrix. In further embodiments, the anion exchange resin comprises a macroreticular anion exchange resin having tertiary amine functionality and a styrene-divinyl-benzene matrix. In some preferred embodiments, the adsorbent styrene-divinyl-benzene resin comprises a non-ionic, hydrophobic, cross-linked resin. The present invention also provides debittered and deacidified fluid prepared according to these methods. In preferred embodiments, the fluid is citrus juice. In particularly preferred embodiments the citrus juice is selected from the group consisting of grapefruit juice, orange juice, tangerine juice, lemon juice, and lime juice.

The present invention also provides compositions comprising one or more bitterness compounds prepared according to the steps of: providing: i) a fluid suspected of containing one or more bitterness compounds, and ii) an adsorbent styrene-divinyl-benzene resin, wherein the adsorbent styrene-divinyl-benzene resin is comprised of particles of about 100–200 microns; and b) contacting the adsorbent styrene-divinyl-benzene resin with the fluid under conditions such that the one or more bitterness compounds adsorbs to the adsorbent styrene-divinyl-benzene resin; c) eluting the one or more bitterness compounds adsorbed to the adsorbent styrene-divinyl-benzene resin; and d) collecting the one or more bitterness compounds.

In some preferred embodiments, the adsorbent styrene-divinyl-benzene resin comprises a non-ionic, hydrophobic, cross-linked resin. In yet other preferred embodiments, the bitterness compound is selected from the group consisting of limonin and naringin. In still other preferred embodiments, the adsorbent styrene-divinyl-benzene resin is contained within a radial flow column. In further preferred embodiments, the fluid is citrus juice. In particularly preferred embodiments, the citrus juice is selected from the group consisting of grapefruit juice, orange juice, tangerine juice, lemon juice, and lime juice.

BRIEF DESCRIPTION OF THE DRAWINGS

FIG. 13 provides a schematic for one embodiment to clean and regenerate columns for repeated use and isolation of bitter/flavor compounds.

DESCRIPTION OF THE INVENTION

Figure 1:
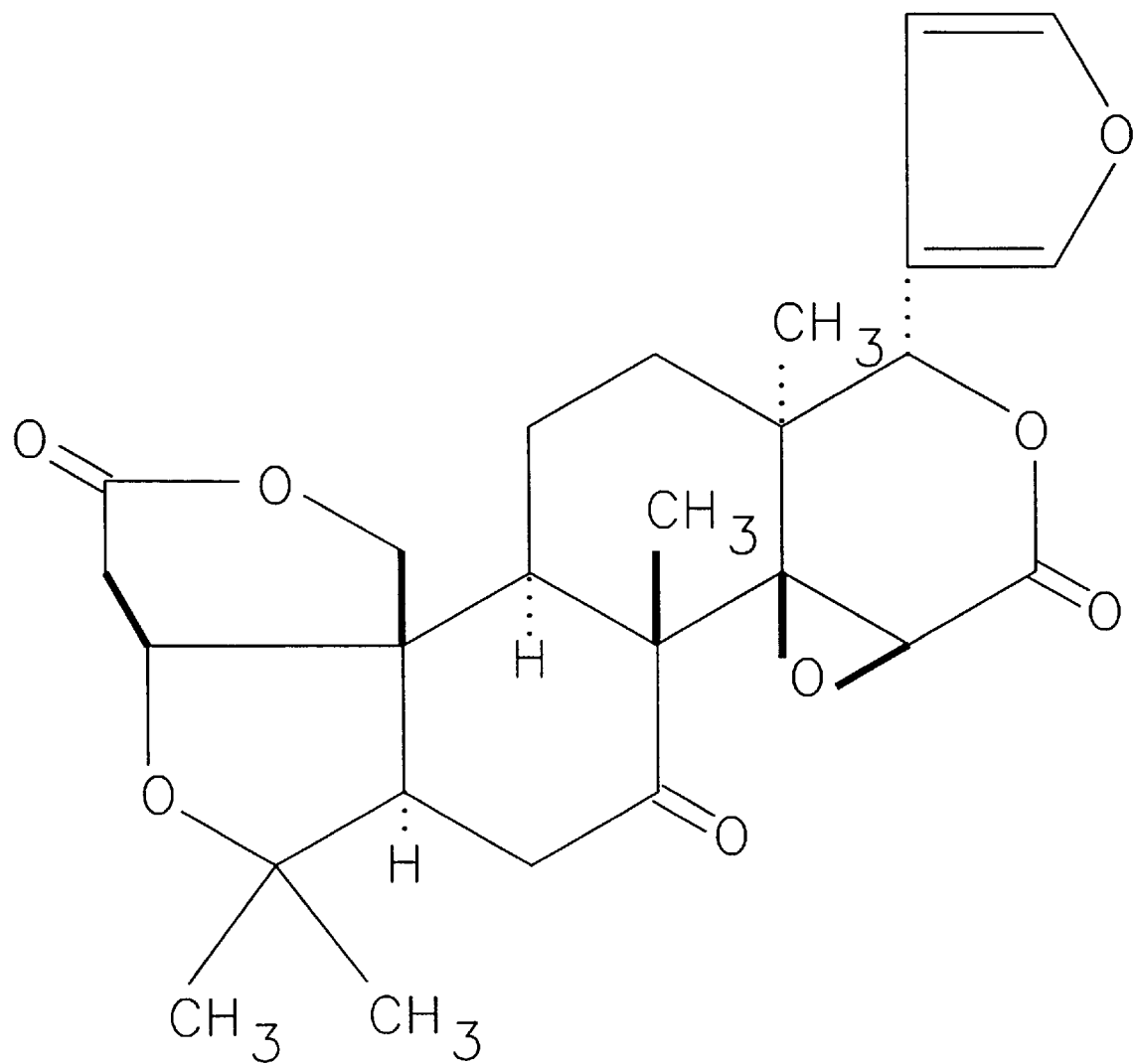
FIG. 1 shows the chemical structure of limonin.
Figure 2:
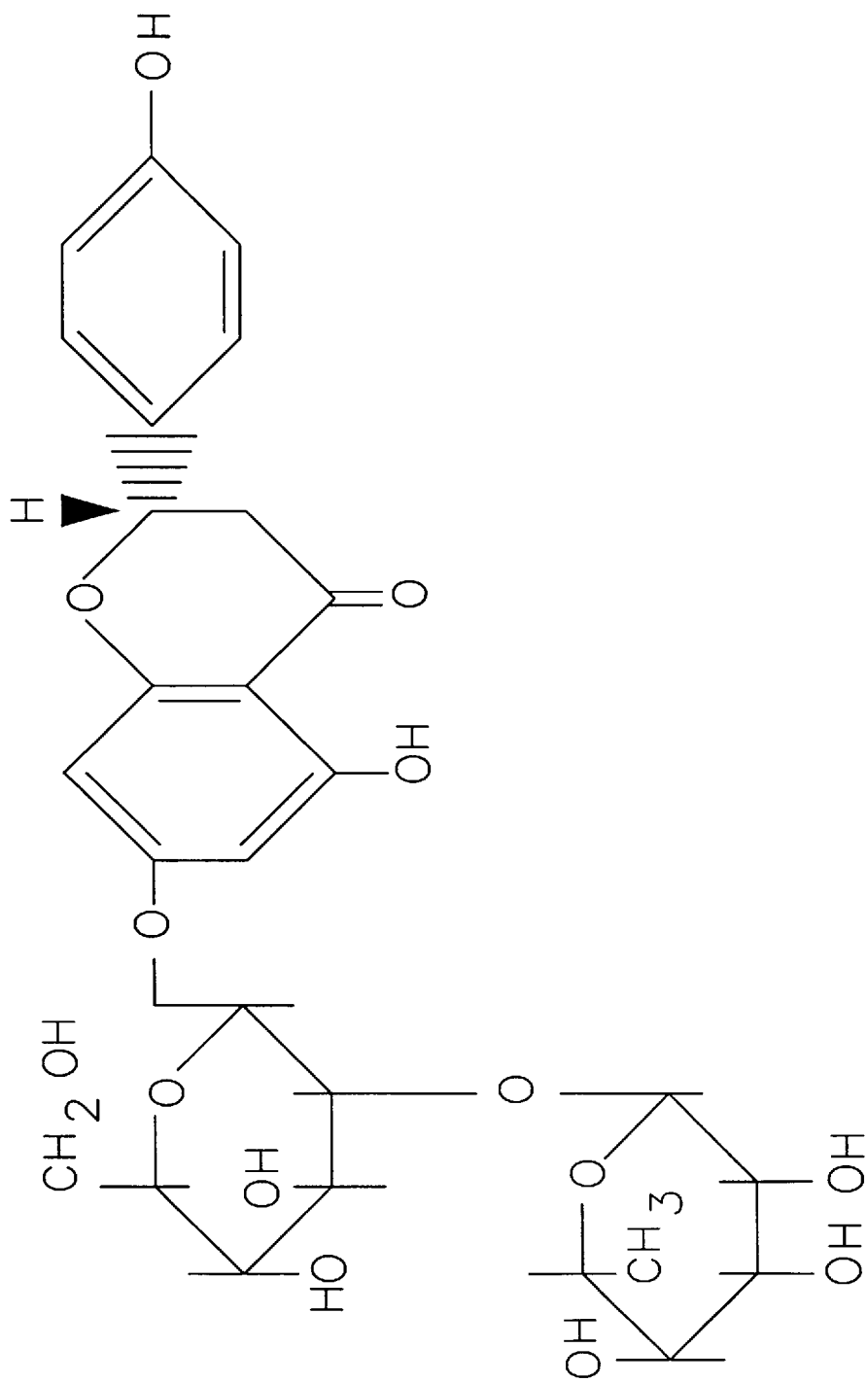
FIG. 2 shows the chemical structure of naringin.

The present invention is directed to improved methods for the processing of citrus products, and more particularly, debittering of fluids. In particular, the present invention is intended for use with citrus juices for the removal of compounds including, but not limited to, limonin and naringin. In one particularly preferred embodiment, the present invention is used for the debittering of orange and grapefruit juices. However, it is contemplated that the methods of the present invention will also be useful for debittering fluids such as other citrus juices, including juices from lemons, limes, tangerines, tangelos, and other citrus fruits, as well as other fruit and vegetable juices.

The present invention provides many significant advantages over the methods described in the prior art for the debittering of citrus juices. In particular, the present invention provides means for processing larger batch volumes of juice in a shorter amount of time than the prior art methods are capable of processing. The present invention therefore represents an efficient and economical means to debitter large volumes of citrus and other juices.

One of the advantages of the present invention include the use of commercially available, FDA-approved styrene-divinyl-benzene (SDVB) cross-linked copolymer resin, (e.g., AMBERLITE® XAD-16) that has been modified to allow high throughput debittering of juice. Thus, in one preferred embodiment, AMBERLITE® XAD-16, commercially available from Rohm and Haas Company, and described in U.S. Pat. No. 4,297,220, herein incorporated by reference, is used as the resin. This resin is a non-ionic hydrophobic, cross-linked polystyrene divinyl benzene adsorbent resin. AMBERLITE® XAD-16 has a macroreticular structure, with both a continuous polymer phase and a continuous pore phase. In a particularly preferred embodiment, the resin used in the present invention has a particle size ranging from 100–200μ.

It is contemplated that other adsorbents such as those in the AMBERLITE® XAD adsorbent series which contain hydrophobic macroreticular resin beads, with particles sizes in the range of 100–200μ, will also be effective in the methods of the present invention. Moreover, different variations of the AMBERLITE®s, such as the Amberchrom® CG series of adsorbents, used with particle sizes in the range of 100–200μ, may also be suitable for use in the present invention. However, it is contemplated that for food, beverages, and feed, the use of governmentally-approved resins in the present invention will be considered important and/or desirable.

Some of the structurally-related characteristics of the above-described adsorbents are summarized in Table 1. As shown in this Table, the polyaromatics are all polystyrene-divinylbenzene copolymers.

TABLE 1

| Resin | Chemical Nature | Mean Surface Area ($m^2g$) | Mean Pore Diam. (Å) | Particle Size |
|---|---|---|---|---|
| AMBERLITE® Adsorbents - Rohm and Haas | | | | |
| XAD-2 | polyaromatic | 300 | 90 | 20–60 mesh |
| XAD-4 | polyaromatic | 725 | 40 | 20–60 mesh |
| XAD-7 | polymethacrylate | 450 | 90 | 20–60 mesh |
| XAD-16 | polyaromatic | 800 | 100 | 20–60 mesh |
| XAD-1180 | polyaromatic | 600 | 300 | 20–60 mesh |
| XAD-2000 | polyaromatic | 580 | 42 | 20–60 mesh |
| XAD-2010 | polyaromatic | 660 | 280 | 20–60 mesh |
| Amberchrom® Adsorbents - Toso Haas | | | | |
| CG-71 m | polymethacrylate | 450–550 | 200–300 | 50–100 μm |
| CG-71 c | polymethacrylate | 450–550 | 200–300 | 80–160 μm |
| CG-161 m | polyaromatic | 800–950 | 110–175 | 50–100 μm |
| CG-161 c | polyaromatic | 800–950 | 110–175 | 80–160 μm |
| Diaion®/Sepabeads® Adsorbents - Mitsubishi Chemical | | | | |
| HP20 | polyaromatic | 500 | 300–600 | 20–60 mesh |
| SP206 | brominated styrenic | 550 | 200–800 | 20–60 mesh |
| SP207 | brominated styrenic | 650 | 100–300 | 20–60 mesh |
| SP850 | polyaromatic | 1000 | 50–100 | 20–60 mesh |
| HP2MG | polymethacrylate | 500 | 200–800 | 25–50 mesh |

TABLE 1-continued

| Resin | Chemical Nature | Mean Surface Area $(m^2g)$ | Mean Pore Diam. (Å) | Particle Size |
|---|---|---|---|---|
| HP20SS | polyaromatic | 500 | 300–600 | 75–150 $\mu$m |
| SP20MS | polyaromatic | 500 | 300–600 | 50–100 $\mu$m |
| DOWEX® Adsorbents - Dow Chemical Company | | | | |
| XUS-40285 | functionalized | 800 | 25 | 20–50 mesh |
| XUS-40323 | polyaromatic | 650 | 100 | 16–50 mesh |
| XUS-43493 | polyaromatic | 1100 | 46 | 20–50 mesh |

Though not limited to the use of adsorbents with any particular composition or obtained by any particular procedure, the preferred adsorbents of the present invention are polystyrene networks. The term "polystyrene network" refers broadly to polymers containing styrene ($C_6H_5CH=CH_2$) monomers; the polymers may be linear, consisting of a single covalent alkane chain with phenyl substituents, or cross-linked, generally with m- or p-phenylene residues, to form a two-dimensional polymer backbone. The polystyrene networks can be further classified, based on their mechanism of synthesis and physical and functional characteristics, as i) conventional networks and ii) hyper-crosslinked networks. The conventional networks are primarily styrene-divinylbenzene copolymers in which divinylbenzene (DVB) serves as the crosslinking agent (i.e., the agent that links linear polystyrene chains together).

In recent years, the use of styrene-divinyl benzene (SDVB) resins for debittering citrus juices has received attention because of the resin's reported capacity and lifecycle advantages. For example, Johnson and Chandler (R. L. Johnson and B. V. Chandler, J. Sci. Food Agricult., 36:48–484 [1985] and R. L. Johnson and B. V. Chandler, Food Technol., 42:130–137 [1988]), and Matthews et al. (R. F. Matthews et al., Food Technol. 44:130–132 [1990]) studied the debittering capacities of SDVB resins with different specific areas and pore diameter. Manlan et al., (M. Manlan et al., J. Food Sci., 55:440–449 [1990]) studied the effect of cross-linkage, porosity, pore diameter, pore volume, and specific area of adsorption of limonin and naringin from grapefruit juice. However, unlike the present invention, none of these references describe the resin particle size as being a critical factor in the debittering citrus juice and high throughput during debittering process. Thus, in contrast to the resin particle size of the present invention (e.g., 100–200$\mu$), these other references describe methods which use particle sizes that are much greater (e.g., 300–1200$\mu$, as described by Puri in U.S. Pat. No. 4,439,458, herein incorporated by reference).

Also, in contrast to the present invention, previously reported methods utilizing SDVB matrices have severe flow limitations; they cannot be used at a level above 0.25 bed volume (BV)/minute. For example, the method described in Puri (U.S. Pat. No. 4,439,458), processed grapefruit juice through the DUOLITE® S-861 column at a maximum flow rate of 0.11 BV/min. Likewise, Mitchell et al., (U.S. Pat. No. 4,514,427) reported maximum flow rate of 0.1 BV/min (1.2 gpm/ft$^3$) for debittering grapefruit juice using DOWEX® resin. In addition, the flow rate achieved by Hernandez et al., using AMBERLITE® XAD-16 to debitter grapefruit juice and pulp wash was only 0.17 BV/min (Hernandez et al., J. Food Sci., 57:664–670 [1992]).

In contrast to the previously reported methods, the relatively small particle size used in the methods of the present invention allows for a much higher throughput level (i.e., much greater flow rates were achieved, allowing for the processing of greater volumes of liquid in shorter time periods). However, it was determined during the development of the present invention that resin particle sizes of approximately 38–75$\mu$ suffered from slow flow rates and high back pressures. Thus, in the preferred embodiment, the particle size of the resin used in the methods of the present invention is approximately 100–200$\mu$.

By providing a means to maximize the throughput capability of the debittering process, while taking advantage of the resin's ability to remove bitterness-causing compounds such as limonin and naringin, the present invention solves many long-felt needs in the art of juice production. In addition, due to the high throughput capabilities, the present invention facilitates the more rapid processing of juices, thereby decreasing the time required for processing, and allowing for an increase in the shelf life of the finished product.

Definitions

To facilitate understanding of the invention, a number of terms are defined below.

As used herein, the terms "fluid" and "solution" are used in reference to any liquid. It is not intended that the present invention be limited to any particular fluid or solution. As used herein, the term "juice" is used in reference to any liquid extracted from a solid material (e.g., fruits or vegetables) used for nutrition of humans and/or other animals. It is not intended that the present invention be limited to any particular juice. Rather, it is contemplated that various juices will be used with the present invention, including, but not limited to, citrus juices, other fruit juices, and vegetable juices. As used herein, the term "citrus juice" is used in reference to the juice obtained from fruit commonly referred to as "citrus fruits." It is contemplated that the term encompass all types of citrus juices, including but not limited to orange, grapefruit, tangerine, lemon, tangelo, lime, pomelo, pumelo, pommelo, pompelmous, shaddock, mandarin oranges, etc. It is also not intended that the present invention be limited to any particular variety of citrus fruit or juice. For example, it is intended that the invention be used with sweet orange, bitter (i.e, Seville or bigarade), bergamot, and other orange varieties.

As used herein, the term "bitterness compound" is used in reference to any compound that renders juice or fluid bitter to the taste. It is intended that this term include, but not be limited to such compounds as limonoids and flavonoids.

As used herein the term "limonoid" is used in reference to those compounds included within the group of compounds commonly referred to as "limonoid," including but not limited to those compounds often found in citrus species, such as limonin, nomilin, and other compounds.

As used herein, the term "flavonoid" is used in reference to those compounds included within the group of compounds commonly referred to as "flavonoids," including but not limited to those compounds often found in citrus species, such as naringin and hesperidin.

As used herein, the term "food" is used in reference to any solid, liquid, semisolid or other material that is used for the nutrition of living things. The term includes any substance that can be taken into the body of an animal or plant to maintain its life and/or growth. It is not intended that the term be limited to any particular type of food. Indeed, it is contemplated that liquid materials (e.g. "drinks") such as juices, and in particular citrus juices be included within the definition. It is also contemplated that the term encompass materials that are used as supplements or additives to other foods. For example, it is intended that the term encompass supplements or additives that are added to a drink in order to provide additional nutritional value to the drink.

As used herein, the terms "feed" and "feedstuff" are used in reference to food that is intended for the nutrition of animals other than humans. It is not intended that the terms be limited to any particular type of feed, and may include any solid, liquid, semisolid, or other material that is used to maintain the life and/or growth of nonhuman animals. It is contemplated that the term include materials used as feed for commercially valuable animals such as livestock (e.g., cattle, sheep, goats, hogs, horses, lagomorphs, etc.), as well as companion animals (e.g., dogs, cats, horses, rodents, lagomorphs, etc.), and laboratory animals (e.g., nonhuman primates, rodents, lagomorphs, etc.). Thus, it is not intended that the term be limited to materials fed to any particular genus, species, breed, variety, or type of nonhuman animal.

As used herein, the term "sample" is used in reference to any material of interest that is treated or analyzed using the present invention. Thus, it is contemplated that the term encompass the starting material analyzed or treated using the present invention. For example, the term "sample" encompasses the material that is contacted with a resin in an embodiment of the present invention. It is also contemplated that the term will encompass a portion or aliquot of a larger quantity of a particular substance. However, it is also contemplated that the term encompass any quantity of material treated using the present invention.

As used herein, the term "resin" is used in reference to semisolid or solid amorphous organic compounds of vegetable, synthetic, or other origin. It is contemplated that the term be used in reference to materials commonly used in chromatographic (i.e., separation) procedures. It is also contemplated that the term be used in reference to materials such as polymeric adsorbents used to adsorb particular chemical compounds from a sample.

The term "resin" is also used in reference to a solid support (such as beads/particles etc.) capable of interacting and binding various compounds, including bitterness compounds, in a solution or fluid (e.g., citrus juice), thereby removing the bitterness compounds. The removal process is not limited to any particular mechanism. For example, bitterness compounds may be removed by an adsorbent or by charge (i.e, affinity interaction). The term "adsorbent resin" refers broadly to both natural organic and synthetic substances. Various adsorbent resins have differing characteristics, including different particle sizes, surface areas, pore sizes, chemical natures (e.g., polystyrene divinylbenzene and acrylic ester), polarities, etc., in order to allow optimum performance for particular applications (e.g., adsorption of bitterness compounds). The adsorbent resins may be packaged in a number of arrangements. It is contemplated that the adsorbent resin be packed in a chromatography column for use in the present invention.

The term "polymer" refers broadly to a material made up of a chain of identical, repeated "base units." The term encompasses materials containing styrene (i.e., $C_6H_5CH=CH_2$) monomers, which may be referred to as "polystyrene networks."

The term "crosslinked" refers broadly to linear molecules that attached to each other to form a two- or three-dimensional network. For example, divinylbenzene (DVB) serves as the crosslinking agent in the formation of styrene-divinylbenzene copolymers. The term also encompasses "hypercrosslinking" in which hypercrosslinked networks are produced by crosslinking linear polystyrene chains either in solution or in a swollen state with bifunctional agents.

As used herein, the term "SDVB" is used in reference to styrene-divinyl-benzene. It is intended that this term encompass any compound such as a chromatography resin that is composed of this compound. In a particularly preferred embodiment, the SDVB of the present invention is comprised of cross-linked copolymer adsorbent SDVB resins that are commercially available. In an alternative preferred embodiment, the SDVB resins are approved for contact with food and/or feed materials by the Food and Drug Administration (FDA).

As used herein, the term "chromatography" is used to refer to the separation of compound(s) of interest from a sample solution or fluid that contains a mixture of compounds. It is contemplated that in some embodiments, the compound of interest that is separated using chromatography materials and methods will be collected (i.e., harvested) and used in any suitable application. It is also contemplated that the term encompass the separation of mixed substances (e.g., a solution) by the passage of the mixed substances through an adsorbing medium. In a preferred embodiment, "chromatography" is used in reference to the passage of a mixture through an adsorbing medium such as a resin suitable for chromatography.

As used herein, the term "chromatography column" or "column" is used in reference to any type of column design that is used for chromatography. Thus, it is contemplated that any type of chromatography column or method suitable for use with liquids or fluids will be used successfully in the present invention. For example, it is contemplated that columns designed for axial, vertical, spiral, as well as radial or horizontal chromatography flow of sample fluids or liquids through the column will be used in the methods of the present invention and/or with the materials of the present invention. It is contemplated that columns such as those disclosed in U.S. Pat. Nos. 3,422,605, 3,453,811, 3,780,866, 4,133,562, 4,354,932, as well as the RFC columns disclosed in U.S. Pat. Nos. 4,865,729, 4,676,898, 4,627,918, and 5,452,659, herein incorporated by reference, will be used successfully in the present invention.

As used herein, the term "RFC" is used in reference to a chromatography column that is characterized as having radial or horizontal flow. It is not contemplated that the present invention be limited to any particular RFC format, size, or shape. Indeed, it is contemplated that cylindrical, conical, and tubular, as well as wedge-shaped (i.e., triangular), and/or other shapes will be successfully used in the present invention. It is also contemplated that any styrene-divinyl benzene resin suitable for radial flow chromatography will be used in the radial flow chromatography embodiment of the present invention.

As used herein, the terms "bed volume" and "column volume" are used interchangeably in reference to the volume of resin packed into a chromatography column. The term "bed volume" is also used in reference to a volume of liquid or fluid (e.g., juice, water, solvent, etc.), added to a column in a volume that is equal to the volume of resin present in the column. For example, one bed volume may be expressed as "1 BV=1 m³ resin."

As used herein, the term "bed volume per minute" (or "BV/min") is used in reference to the number of bed volume equivalents of fluid that will pass through the bed volume during a one minute period. Thus, the term provides a "flow rate," which indicates that fluid is passed through the column at a certain rate of flow. Thus, as used herein, the term "flow rate" is used in reference to the speed at which a fluid or liquid (e.g., juice, water, solvent, etc.) passes through the resin present in a packed chromatography column. For example, if the flow rate for a particular column and sample fluid is indicated as being one bed volume per minute, this means that the sample fluid passes through the column at a flow rate of 1 BV/minute throughout the chromatography process.

As used herein, the term "breakthrough" is used in reference to situations in which compounds to be removed from a fluid are not removed. For example, breakthrough occurs during chromatography when the resin is incapable of binding the compound to be removed and the compound remains in the fluid sample used in the column. Breakthrough of the compound usually starts when the resin becomes saturated with the compound. The occurrence of breakthrough is potentially the result of numerous variables, including, but not limited to, the flow rate, pH, ionic strength of the sample and/or buffer, and the presence of compounds other than the compound of interest in the sample fluid.

Column chromatography procedures are commonly terminated at a breakthrough level of 10–20%, as the end product of the procedure is usually judged as containing an excess of the compound to be removed. For example, at 20% breakthrough, the quality of the end-product (e.g., juice) may be too low for the product to be acceptable. Although breakthrough values of 10–20% are commonly used in the art, in some instances, breakthrough values that are much higher (e.g., 50%) are acceptable, as long as the overall concentration of the undesirable compound is satisfactory. Thus, for citrus juices, a breakthrough value greater than 20% may be acceptable, as long as the concentration of bitterness compound is sufficiently low that the quality of the end product (e.g., debittered juice obtained from multiple runs and pooled into one batch) obtained is satisfactory.

As used herein, the term "substantially removed," is used in reference to the removal of a large percentage of a compound desired to be removed. It is contemplated that this term encompass the removal of sufficient bitterness compound such that Food and Drug and Citrus regulations (e.g., the regulations of the Florida Department of Citrus) will be met. For example, the Florida Department of Citrus regulations indicated that grade A grapefruit juice produced in Florida between 1 August and 1 December must contain less than 600 ppm naringin or less than 7 ppm limonin (R. F. Matthews et al., supra). It is further contemplated that the term encompass removal of bitterness compounds from citrus juices such that bitterness is not detected in sensory tests (i.e., taste tests). Thus, it is contemplated that substantial removal of bitterness compounds from citrus juices is achieved at the point that objectional bitterness cannot be tasted in juices tested by humans.

For example, it is contemplated that the present invention allows for the removal of 5–6 grams of naringin per 100 ml of wet resin. It is thus contemplated that 100 ml volume of west resin, containing an approximate moisture content of 60%, will have the capacity to remove 5–6 grams of bitterness compound (e.g., naringin). It is thus contemplated that the removal of naringin will approximate 5–6 g/liter of fluid or 5000–6000 ppm, with 1 ppm being the equivalent of 1 mg/l.

In addition, the present invention encompasses methods for the deacidification of fluids such as juices (e.g., citrus juices). Although the present invention is not limited to grapefruit juice, grapefruit juice with Brix/acid ratio greater than 15 is generally regarded in the art as being a reduced acid juice. However, it is not intended that the present invention be limited to methods and compositions encompassing juice that has a Brix/acid ratio that is greater than 15. Thus, although in preferred embodiments, the Brix/acid ratio is greater than 15, in other embodiments, the Brix/acid ratio is less than 15. It is contemplated that these deacidification methods be used alone, or in conjunction with debittering methods, including, but not limited to the debittering methods of the presently claimed invention. Thus, the present invention provides fluids that contain a decreased acid concentration (i.e., as compared to the starting fluid). In some embodiments, the acidity of fluids such as citrus juice are deacidified by at least 15%, while in other more preferred embodiments, the juice acidity is reduced by at least 20%. In particularly preferred embodiments, the juice acidity is reduced by more than 25%, as compared to the acidity of the starting juice (i.e., the juice used to prepare the deacidified juice). By providing juice that has had acids (e.g., citric acid) removed, the present invention provides juices that allow the consumption of fruit juices by patients suffering gastric disturbances.

As used herein, the term "single strength" is used in reference to juice or other liquid that has not undergone any concentration procedures. For fruit juices, the term is used in reference to the strength of juice directly obtained from fresh fruit (i.e., prior to any treatment other than extraction of the juice from the fruit) or juice of an equivalent strength. It is contemplated that single strength juice be prepared by any means, including direct extraction from fruit, dilution of concentrated juices, and any other means commonly used in the art.

EXPERIMENTAL

The following examples are provided in order to demonstrate and further illustrate certain preferred embodiments and aspects of the present invention and are not to be construed as limiting the scope thereof.

In the experimental disclosure which follows, the following abbreviations apply: eq (equivalents); M (Molar); $\mu$M (micromolar); N (Normal); mol (moles); mmol (millimoles); limol (micromoles); nmol (nanomoles); g (grams) mg (milligrams); $\mu$g (micrograms); ng (nanograms); 1 or L (liters); ml (milliliters); $\mu$l (microliters); cm (centimeters); $\mu$(micron); mm (millimeters); $\mu$m (micrometers); nm (nanometers); ° C. (degrees Centigrade); ppm (parts per million); gpm (gallons per minute); bv and BV (bed volume); CV and cv (column volume); Rohm and Haas (Rohm and Haas, Philadelphia, Pa.); VWR (VWR Scientific, Westchester, Pa.); Gelman (Gelman Sciences, Ann Arbor, Mich.); Sigma (Sigma Chemicals, St. Louis, Mo.); Reichert-Jung, (Reichert-Jung, Cambridge Instruments, Inc., Buffalo, N.Y.).; Perseptive (Perseptive Biosystems, Cambridge, Mass.); Merck (E. Merck, Darmstadt, Germany); and RFC (radial flow column).

EXAMPLE 1

Preparation of Columns

In this Example, AMBERLITE® XAD-16 (Rohm and Haas) was used to debitter citrus fruit juice. This resin was chosen for this Example, as it has been approved by the FDA under 21 CFR 173.65 for use with food.

In this Example, aliquots of AMBERLITE® XAD-16 resin were packed into an axial column (1.5 cm×20 cm; bed volume of 33 ml) and a wedge-shaped RFC column (bed volume of 50 ml). In this experiment, various resin particle sizes were tested. For example, columns were packed with the resin as provided by the manufacturer (i.e., with a particle size of 300–1200$\mu$), as well as resin that was ground into various particle sizes ranging from 38–200$\mu$. The ground resin was produced by dehydrating the AMBERLITE® XAD-16 resin at 60° C. for 16 hours, and then grinding the resin in a coffee grinder ("Fast-Touch" coffee mill, Krups) for a 15 second burst followed by a 10 second burst. Different particle sizes ranging from 38–200$\mu$ were separated into discrete groups by using a standard molecular sieve (VWR). After packing in the columns, the resins were preconditioned by passing 5 bed volumes (BV) of 95% ethanol, followed by 5 BV of distilled water, 5 BV of 0.5 M NaOH, 5 BV of distilled water, 5 BV of 0.5 M HCl, and 5 BV of distilled water through the columns.

In addition to the AMBERLITE® XAD-16 resin, AMBERLITE® IRA-95 was also tested for its ability to debitter juice. AMBERLITE® IRA-95 (Rohm and Haas) has a base matrix styrene divinyl benzene copolymer, with a tertiary amine as the functional group. The resin is a weak base anion exchanger, with a particle size of 350–400$\mu$.

In this Example, the AMBERLITE® IRA-95 was packed into an axial column (1.5 cm×20 cm; bed volume of 33 ml). After packing this column, the resin was preconditioned by passing 5 bed volumes (BV) of 95% ethanol, followed by 5 BV of distilled water, 5 BV of 0.5 M NaOH, 5 BV of distilled water, 5 BV of 0.5 M HCl, and 5 BV of distilled water through the column.

EXAMPLE 2

Preparation of Juice

In this Example, juice was extracted from grapefruits in preparation for debittering the juice. Ruby grapefruits were obtained from the Shield's Date Garden, Indio, Calif., during January 14 April 1996. Each grapefruit, excluding the rind, was sliced and equal amount of distilled water was added. Juice was extracted from the fruit using Waring Commercial Laboratory Blender and kept at room temperature for 30-min with magnetic stirring and then centrifuged at 5000 rpm for 10-min at room temperature. The supernatant was collected and filtered through a 40$\mu$ filter to remove large suspended particles.

Although these Ruby grapefruits from Shield's Date Garden represented the majority of the fruit tested, additional grapefruits obtained from local supermarkets were also tested using the debittering process of the present invention. The results obtained with all of the grapefruits tested were similar.

EXAMPLE 3

Debittering of Juice

In this Example, the columns prepared in Example 1 were used to debitter the supernatant (i.e., juice) obtained as described in Example 2. In this Example, various flow rates, ranging from 0.15 BV to 2 BV/min were used with the AMBERLITE® XAD-16. For all of the columns, the first bed volume was discarded as it consisted of water. The samples tested in this Example consisted of successive 4 to 6 bed volumes, totally approximately 36–40 bed volumes of juice tested. With the AMBERLITE® IRA-95 resin, a total of approximately 20 bed volumes of juice were tested, at a flow rate of 0.15 BV/min.

Following each run of the debittering process, the columns were cleaned using 95% ethanol, followed by 5 bed volumes of distilled water, 5 bed volumes of 0.5 M NaOH, 5 bed volumes of distilled water, 5 bed volumes of 0.5 M HCl, and 5 bed volumes of distilled water. The 0.5 M HCl and 0.5 M NaOH used in this cleaning process were chosen because they neutralize each other and make the cleaning process environmentally friendly. The ethanol was recovered using a Bucki/Brinkman rotary evaporator equipped with a distillation unit (VWR). The recovered ethanol was saved and used in subsequent cleaning runs. Samples of cleaning solutions from each of the fifth bed volumes used in these wash steps were tested for the presence of naringin as described in Example 4. The columns were only reused if there was no detectable naringin in the acid and distilled water washes.

Figure 3:
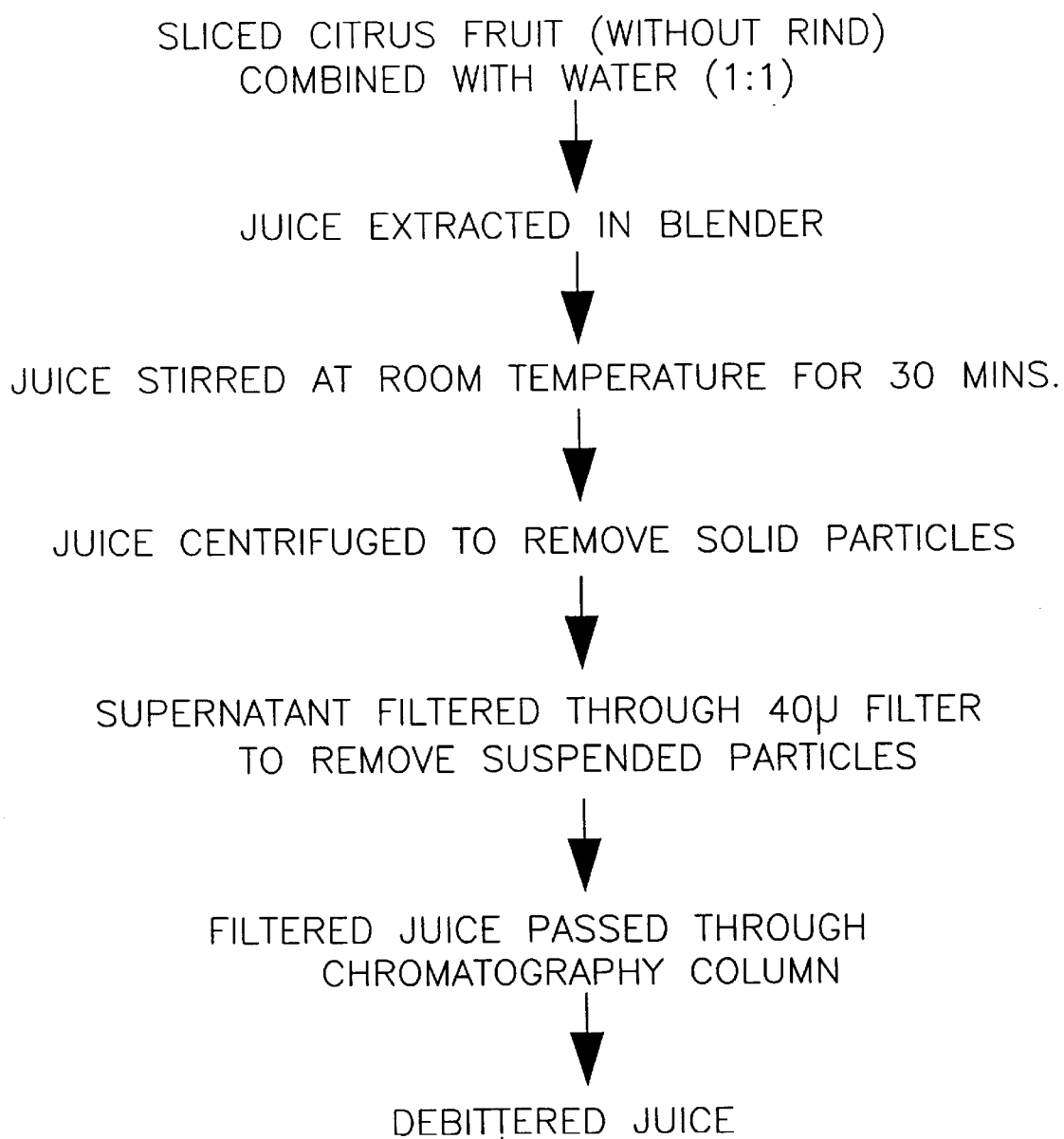
FIG. 3 is a schematic of the debittering process of the present invention.

FIG. 3 is a schematic of the debittering process, including the steps of preparing the fruit (i.e., Example 2), through the production of debittered juice. Following the debittering process, the bitter compounds (limonin and naringin) were eluted from the column using 95% ethanol. These analyses are described in the following examples. The bitter compounds harvested from these columns may be used as a flavoring compound for food and/or feed.

It is contemplated that the method described in this Example will be modified according to the needs of the user. For example, it is intended that the column sizes and volumes will be modified so as to permit the large scale processing of juice necessary in the citrus juice industry. As the values provided in these Examples are expressed in terms of the bed volumes used, rather than the absolute volumes used in individual experiments, it is contemplated that the process will be scaled up or down to any volume desired. Thus, large-scale processing of juice by use of this invention is possible by utilizing the bed volumes and maintaining the ratios as needed, based on these Examples.

EXAMPLE 4

Analysis of Naringin

In this Example, juice treated using the methods of the present invention was tested for its naringin concentration using the method described by Hendrickson et al., (R. Hendrickson et al., Proc. Florida Hort. Soc., 71:194–198 [1958]).

Briefly, test samples of untreated grapefruit juice and juice debittered according to the methods of Example 3 were tested for their naringin concentration. For each test, 0.1 ml of juice was mixed with 9.9 ml isopropanol (VWR). The mixture was kept at room temperature for 2 hours and then filtered through Whatman #42 filter paper. The filtered solution was then evaluated for its naringin concentration using a LKB Biochrom Ultrospec 4050 spectrophotometer at 284 nm. A sample of isopropanol was used as a blank control. The naringin concentrations obtained from the test samples were compared with a standard curve prepared using solid naringin (Sigma), in which the solid naringin was either dispersed in isopropanol and processed as described for the test samples, or solid naringin was mixed with juice and then processed as described above for the test samples. The standard curve was linear within the range of 10–30 ppm naringin. The absorbance at 284 nm was between 0.264 and 0.800.

Figure 4:
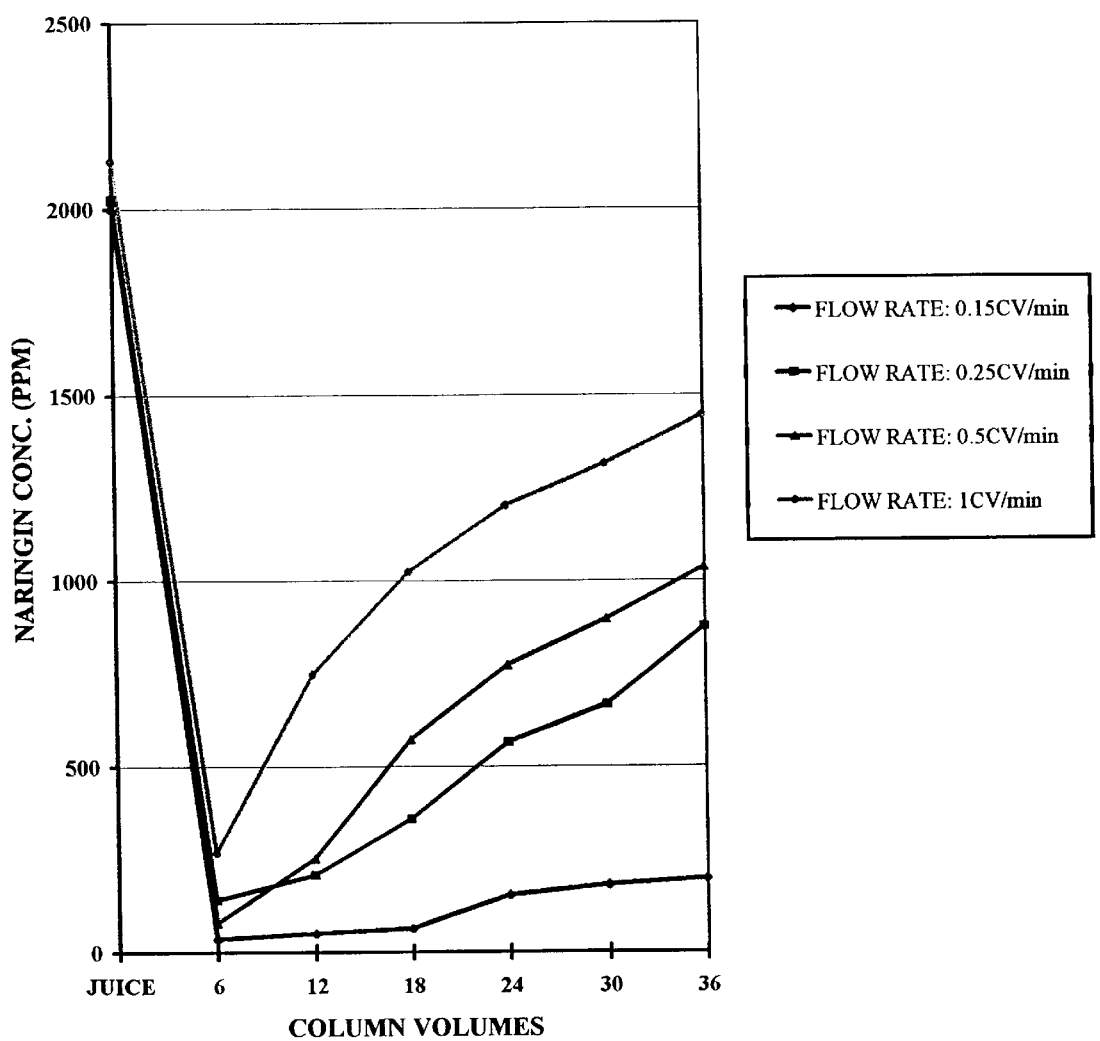
FIG. 4 shows the naringin concentration of grapefruit juice debittered using AMBERLITE® XAD-16 particle sizes of 300–1200μ.
Figure 5:
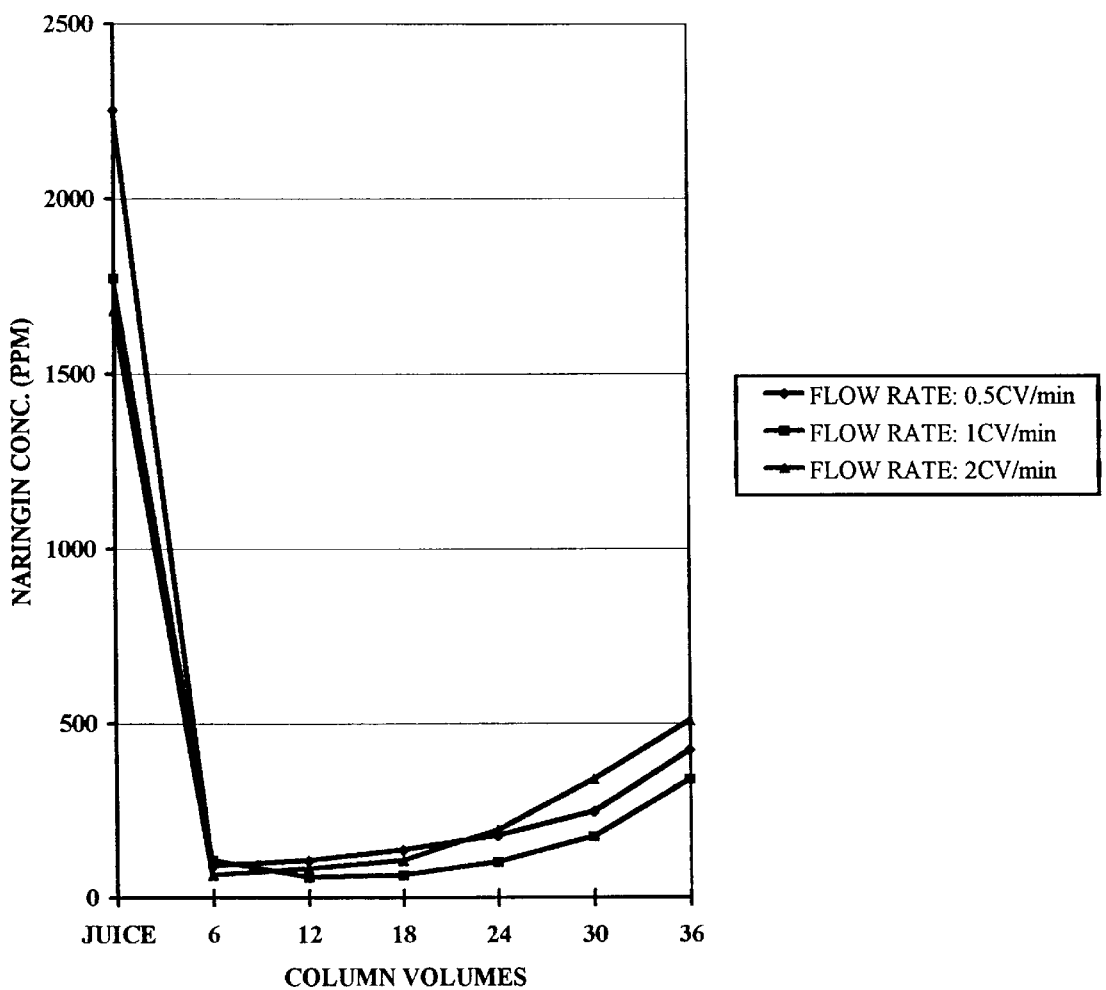
FIG. 5 shows the naringin concentration grapefruit juice debittered using AMBERLITE® XAD-16 particle sizes of 100–200μ.

FIGS. 4 and 5 show the results of this analysis. FIG. 4 shows the naringin concentrations in juice eluted through the axial column prepared in Example 1 (1.5 cm×20 cm; BV/33 mL) packed with commercially available AMBERLITE® XAD-16, with a particle size of 300–1200μ. As shown in this Figure, at a very slow flow rate (i.e., 0.15 BV/min), the resin effectively removed bitterness in the form of naringin, even after 36 BV of juice was passed through the column. For example, after 6 BV of juice was passed through the column very little naringin was detected. This result is consistent with the results reported by Puri and Mitchell et al. (U.S. Pat. Nos. 4,439,458 and 4,514,427, respectively).

However, as also shown in FIG. 4, at flow rates above 0.25 BV/min, 20% breakthrough of naringin started earlier than 36 BV. For example, flow rate of 0.25 BV/min, 20% breakthrough started when 24 BV of juice was passed through the column, while at a flow rate of 0.5 BV/min, 20% breakthrough started when 18 BV of juice was passed through the column. At a flow rate of 1 BV/min, 20% breakthrough started after only 12 BV of juice was passed through the column.

In contrast, debittering of grapefruit juice was found in this Example to be possible with ground AMBERLITE® XAD-16 of a particle size 100–200μ, at a flow rate even faster than 2 BV/min in the same axial column format. These results are shown in FIG. 5. In this experiment, at a flow rate of 2 BV/min, 20% breakthrough of naringin started after 30 BV of juice was passed through the column.

Figure 6:
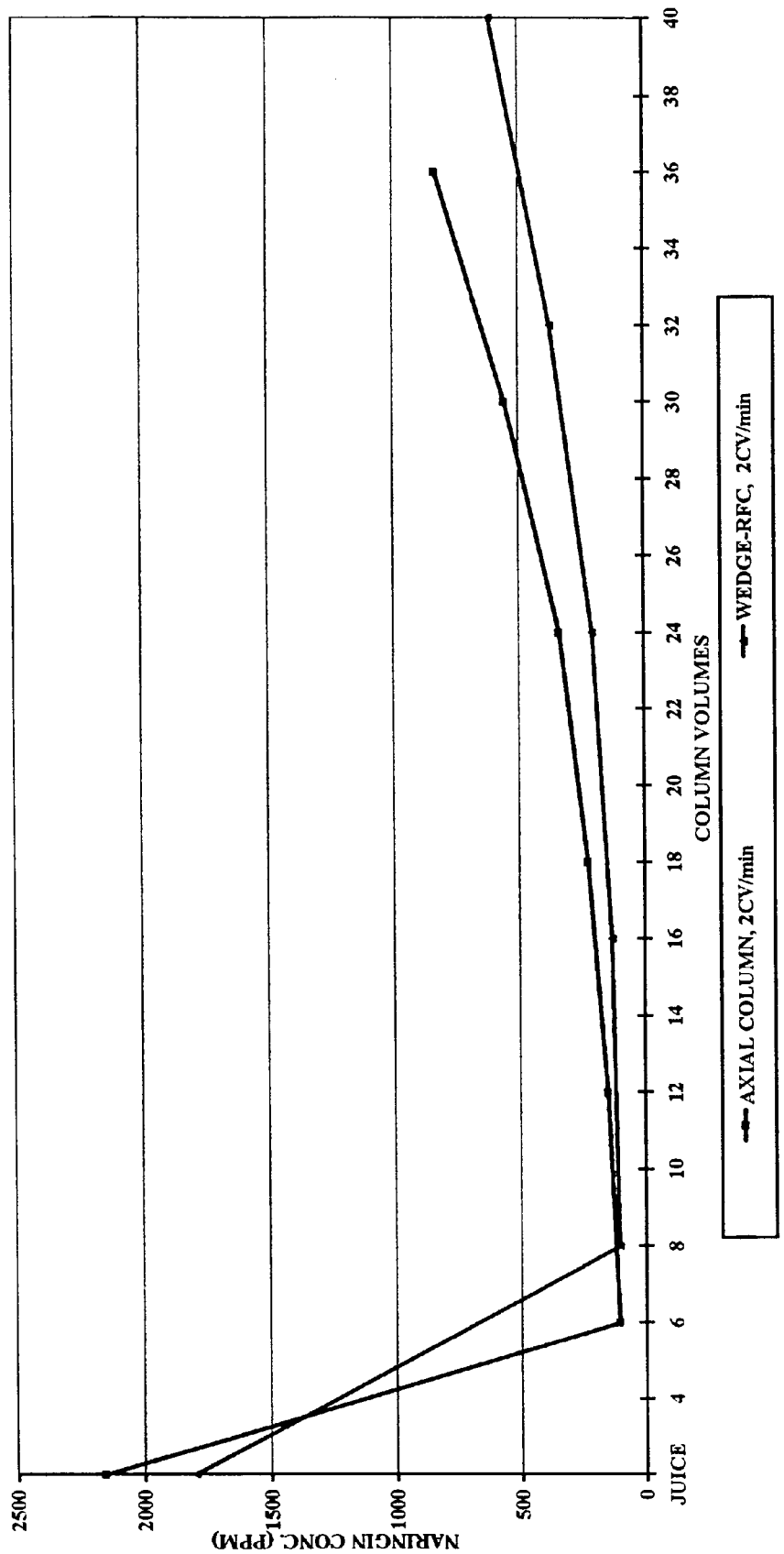
FIG. 6 shows a comparison between axial and RFC columns for debittering of grapefruit juice.

In addition to the exceptional results obtained with the axial column packed with ground AMBERLITE® XAD-16 of a particle size 100–200μ, the wedge RFC columns prepared as in Example 1, performed even better. In this experiment, at 2 BV/min, 20% breakthrough started when 40 BV of juice was passed (FIG. 6). As shown in FIGS. 4–6, resin particle sizes of approximately 100–200μ were exceptionally suited for debittering citrus juice, while use of particle sizes of 38–75μ resulted in slow flow rates (i.e., less than 0.5 BV/min) and high back pressures (i.e., above 15 psi). Because of the slow flow rate and high back pressure, the juice tested with the column packed with resins having particle sizes ranging from 38–75μ was considered to be unsatisfactory. No additional testing was conducted on this juice.

Figure 7:
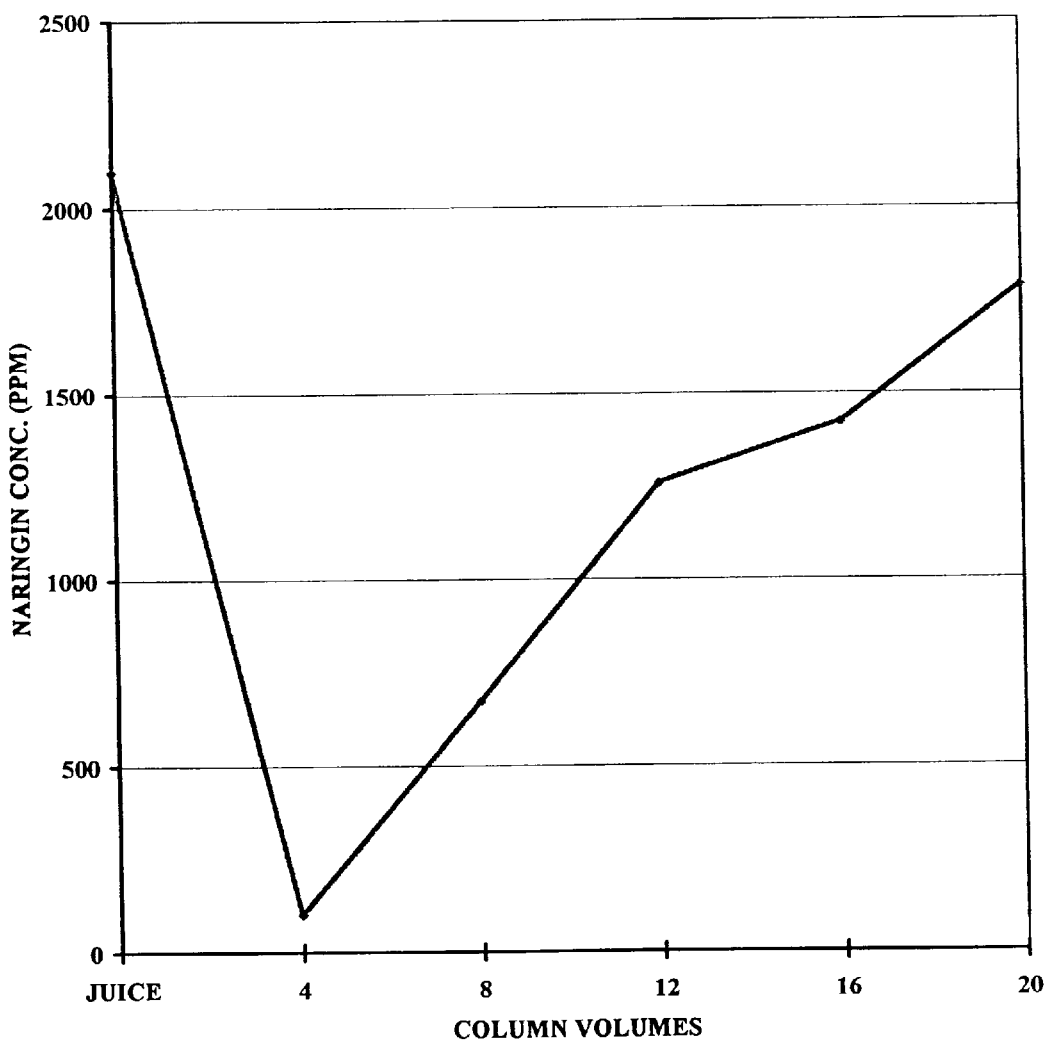
FIG. 7 shows the naringin concentration of grapefruit juice debittered using the AMBERLITE® IRA-95 resin.

For the AMBERLITE® IRA-95 resin, the maximum flow rate possible was very low (0.15 BV/min). Also, 20% breakthrough was observed after only seven BV's of juice. Finally, the juice produced after treatment with the IRA-95 resin was coagulated due to the removal of acid from the juice. FIG. 7 is a graph showing the results of the naringin concentration determinations obtained with this resin. As shown on this Figure, for 8 BV and greater, the naringin concentrations too high to meet the Florida Citrus Department regulations for the maximum concentration of naringin allowed in grapefruit juice (i.e., 600 ppm naringin). Thus, the IRA-95 resin was determined to be unsatisfactory for the debittering of citrus juice according to the present invention.

In sum, this Experiment shows that with AMBERLITE®E XAD-16 of particle size 300–1200μ, juice could be not processed using a high flow rate (i.e., above 0.15 BV/min). At this particle size, the capacity decreased as the flow rate increased, as shown in FIG. 4. In contrast, using the methods of the present invention, (i.e., AMBERLITE® XAD-16 with particle size of 100–200μ), a very high flow rate (e.g., 2 BV/min) was possible without the concomitant sacrifice in the capacity of the resin, as shown in FIG. 5. In addition, small particle sizes (e.g., 38–75μt) were also found to be unsatisfactory, as was an alternate resin (AMBERLITE® IRA-95).

EXAMPLE 5

Analysis of Vitamin C

In this Example, juice treated using the methods of the present invention was tested for its vitamin C content using the method described by Plummer (D. T. Plummer, *An Introduction to Practical Biochemistry*," McGraw-Hill Book Co., UK, pp. 318–319 [1978]).

Briefly, a stock of 2,6 dichlorophenolindophenol solution was prepared by dissolving 100 mg powdered 2,6 dichlorophenolindophenol (Sigma) in 100 ml distilled water. Working dye solution was then prepared from this stock at a concentration of 2 mg/ml 2,6 dichlorophenolindophenol. Stock ascorbic acid solution was also prepared by dissolving 100 mg ascorbic acid powder (Sigma) in 100 ml distilled water. A working ascorbic acid solution standard was then prepared from this stock at a concentration of 2 mg/100 ml ascorbic acid.

To analyze the vitamin C content of debittered and untreated juice, test samples were prepared by mixing 5 ml of diluted juice (1:10 dilution of juice prepared in distilled water) and 1 ml glacial acetic acid (VWR). The juice was titrated with working dye solution until a faint permanent pink color was produced. The burette readings were recorded (T).

The titrations were also conducted with a blank control (5 ml distilled water and 1 ml acetic acid), and with a standardized ascorbic acid solution (5 ml ascorbic acid [2 mg/100 ml]) and 1 ml acetic acid). These burette readings were also recorded, with the blank value given the designation "B1," and the standard solution given the designation "St.". The vitamin C content of the juice samples were determined using the formula:

Vitamin C of test (mg/100 ml)=(T−B1/St−B1)×2×dilution factor.

The vitamin C concentration of untreated grapefruit juice was approximately 19 mg/100 ml. The vitamin C concentration of most of the grapefruit juice samples debittered according to the present invention was approximately 16 mg/100 ml juice. Thus, the approximate decrease in vitamin C content was about 16%. Thus, the loss of vitamin C in this process was less than that obtained by other researchers (see e.g., R. Couture and R. Rouseff, J. Food Sci., 57:380–384 [1992]).

EXAMPLE 6

Sensory Detection of Bitterness

Samples from each run of the previous Examples were tested by a six-member panel of tasters. Using the 100–200μ particle size AMBERLITE® XAD-16 resin to debitter grapefruit juice as described in the above Examples, no bitter taste was detected in samples of pooled grapefruit juice in samples from 21–30 CV (i.e., where 20% breakthrough was found to begin). Although bitterness was detected in samples at 31 CV and higher, the bitterness was less than that detected in the original, untreated juice sample. Thus, even at higher column values and therefore, breakthrough levels that are relatively high, the present invention is useful for the production of a product with bitterness that has been minimized.

EXAMPLE 7

Debittering of Naval Orange Juice

In this Example, juice obtained from naval oranges was debittered. For these experiments, aliquots of AMBER- LITE® XAD-16 resin (as described in Example 1, above) were packed into an axial column (1.5 cm×20 cm; bed volume of 33 ml) and a RFC column (250 ml bed volume). The ground resin was produced by dehydrating the AMBERLITE® XAD-16 resin at 60° C. for 16 hours, and then grinding the resin in a coffee grinder ("Fast-Touch" coffee mill, Krups) for a 15 second burst followed by a 10 second burst. Different particle sizes ranging from 38–200$\mu$ were separated into discrete groups by using a standard molecular sieve (VWR). Particles of 100–200 $\mu$M were used to pack the axial and RFC columns. After packing in the columns, the resins were preconditioned by passing 2 bed volumes (BV) of 95% ethanol, followed by 2 BV of distilled water, 2 BV of 0.5 M NaOH, 2 BV of distilled water, 2 BV of 0.2 M HCl, and 5 BV of distilled water through the columns. After each debittering cycle, the columns were reconditioned using the same conditions as used for preconditioning.

Naval oranges obtained from local grocery stores were used in these experiments. Each fruit, including the rind, was sliced, and an equal amount of distilled water was added. The juice was extracted using a Waring Commercial Laboratory blender. Following extraction, the juice was stirred at room temperature for 30 minutes, and then centrifuged at 5000 rpm (3,735×g) for 10 minutes at 15° C. In order to remove large suspended particles, the supernatant was filtered through a 40$\mu$ filter (VWR 417 filter paper). The supernatant was then passed through the packed axial and RFC columns described above. The flow rate of each column was 0.25 BV to 0.5 BV/minute. The first bed volume from each column was discarded, as it consisted of water. Samples obtained from four successive bed volume collections were saved for further analyses.

Figure 8:
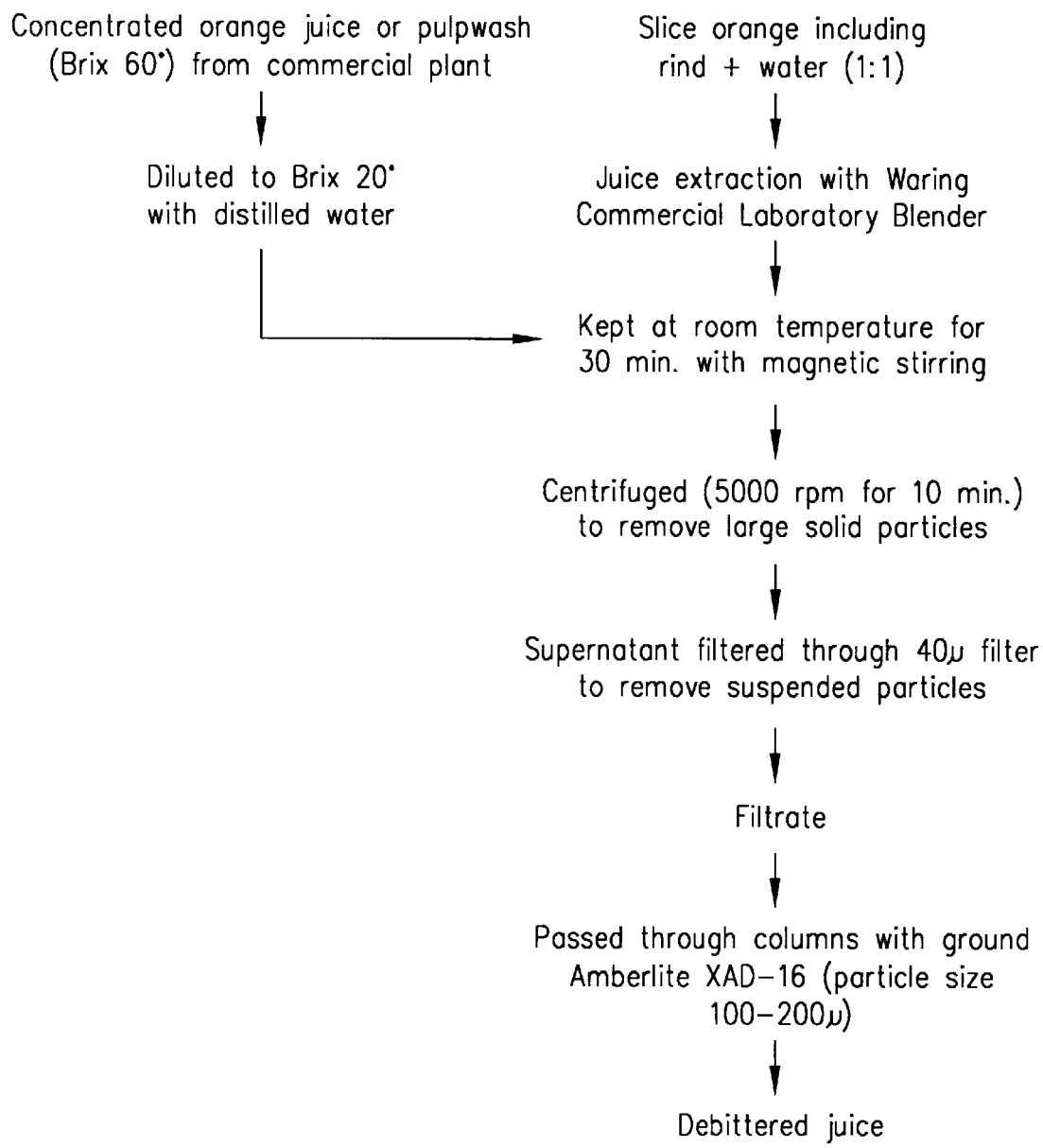
FIG. 8 provides a schematic of one embodiment of the debittering process.

In addition to the above oranges, concentrated bitter Naval orange juice (Brix 60°), and Valencia pulp wash (Brix 60° C.) was obtained from Sunkist Growers, Inc. (Ontario, Calif.), and also used in the debittering process. In most runs, the concentrated juice and pulp wash were diluted with distilled water (1:3 dilution), and centrifuged at 5000 rpm (3,735 ×g) for 10 minutes at 15° C. The supernatant was filtered through a 40$\mu$ filter (VWR 417 filter paper), to remove large suspended particles, and then passed through the RFC and axial columns at a flow rate of 0.25 BV/min to 0.5 BV/min, as described above for the Naval oranges. In these experiments, up to 36 BV of juice was passed through each column for both the concentrate and pulp wash. FIG. 8 is a schematic showing the steps in the debittering embodiments described in this Example.

EXAMPLE 8

Analysis of Soluble Solids and Limonin

In this Example, the filtered juice, concentrate and pulp wash processed as described in Example 7 were analyzed for their soluble solid and limonin content. In these experiments, control juice (i.e., juice that was not processed as described in Example 7), was also used ("bitter juice").

Figure 9:
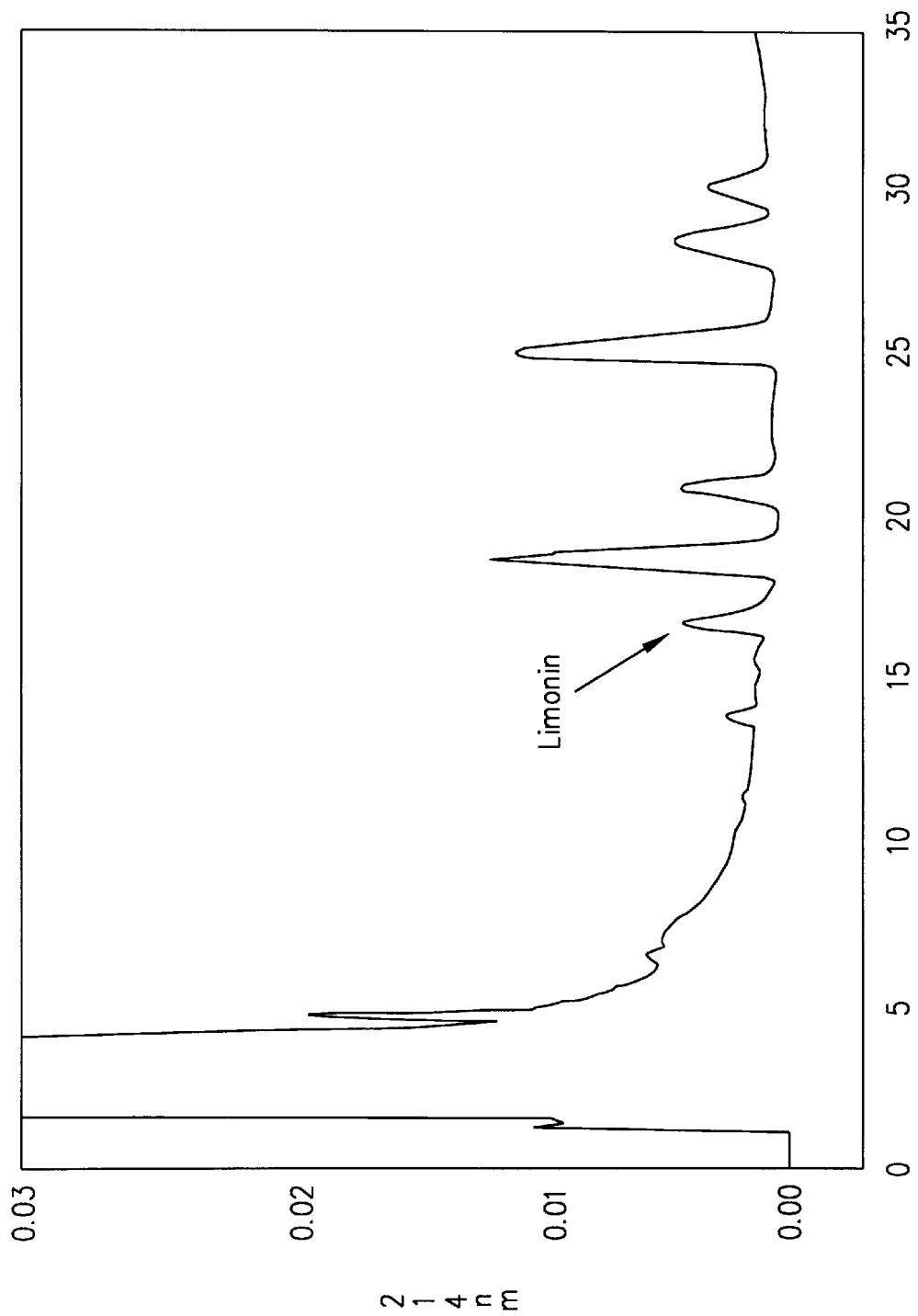
FIG. 9 shows an HPLC pattern obtained with bitter orange juice.
Figure 10:
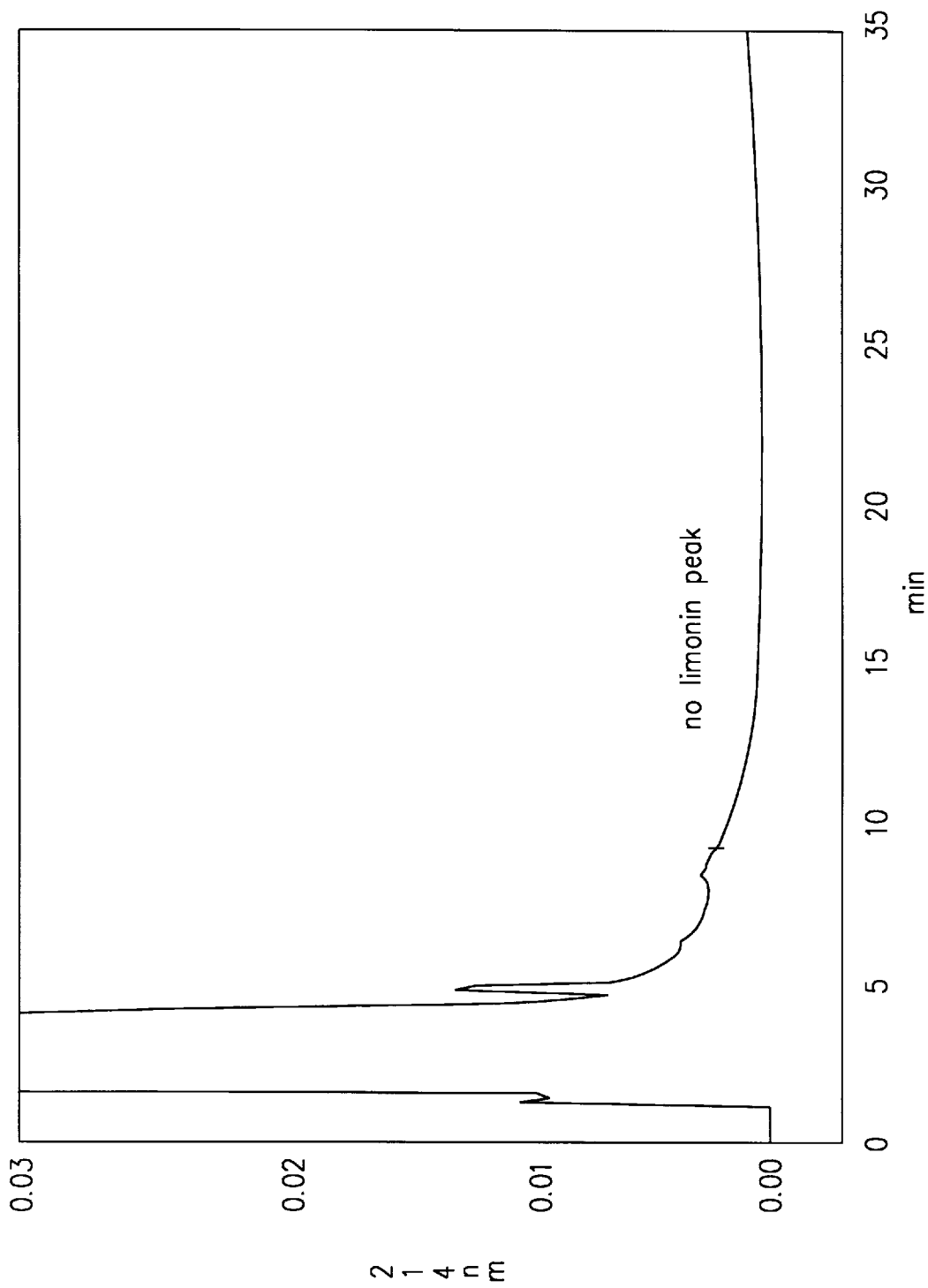
FIG. 10 shows an HPLC pattern obtained with debittered orange juice.
Figure 11:
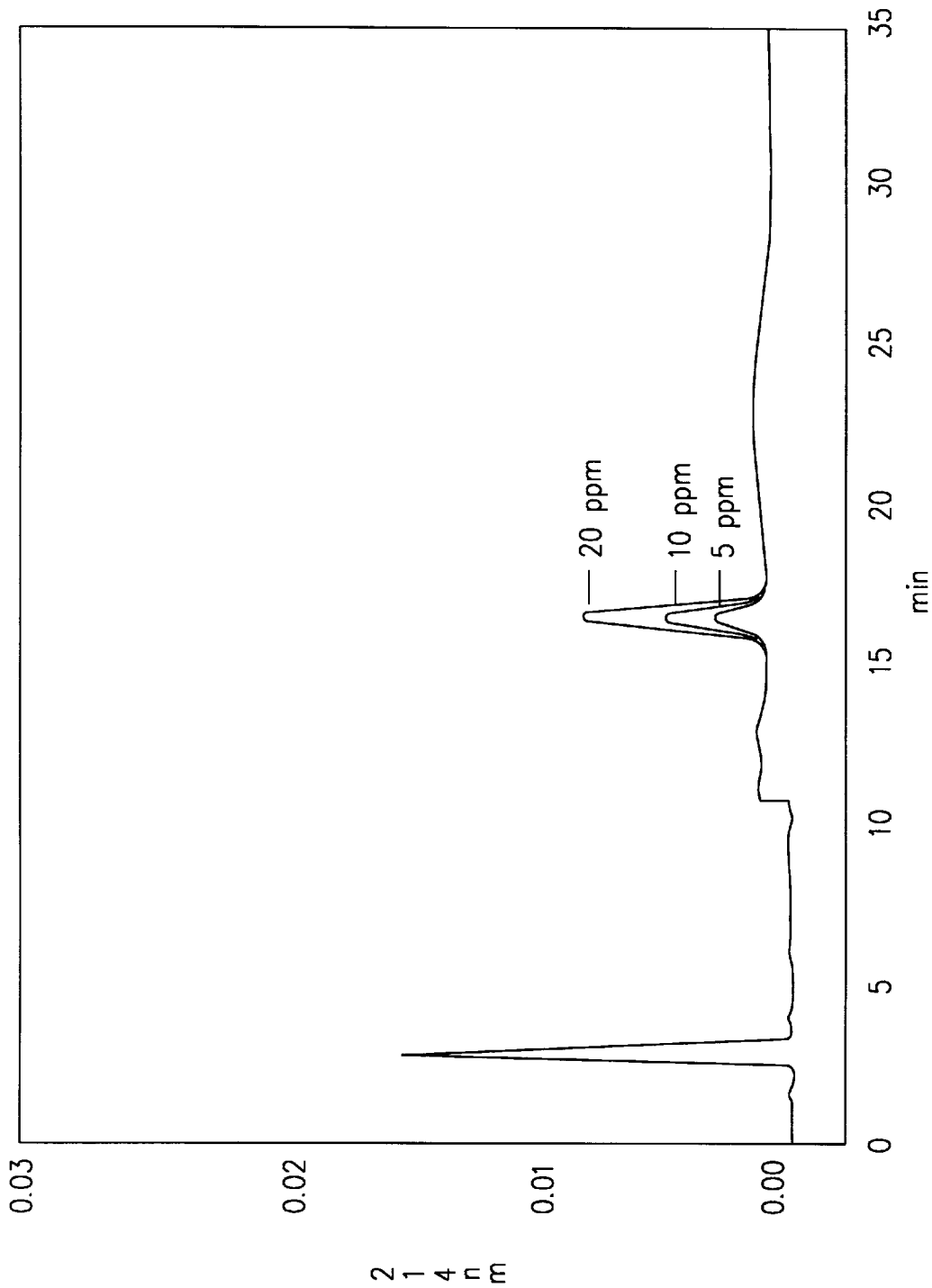
FIG. 11 shows an HPLC pattern obtained with standard limonin dissolved in 100% acetonitrile.

The soluble solid content for each sample, including the bitter juice control, was determined using a hand refractometer (Reichert-Jung), as described by the refractometer manufacturer. The limonin content was determined using the BioCAD (Perseptive), equipped with a C18-Reversed Phase HPLC column (250 mm×4 mm) (LiChosorb RP-18, Merck), and a UV detector. Prior to injection into the BioCAD, the juice was heated to 90° C. for 5 minutes with 40% aqueous acetonitrile (1:1 dilution), in order to dissolve any precipitated limonin, and close the ring on any limonate A-ring lactone present in the sample. The samples were then filtered through a 0.45$\mu$ filter (Gelman). The filtered samples were injected into the HPLC column, and 37% acetonitrile (i.e., the mobile phase) was passed through the column. The flow rate of the mobile phase was 1 ml/min., and the effluent was monitored at 214 nm. The total analysis time was approximately 35 minutes. The concentration of limonin in each of the samples was quantitatively measured by comparing peak area with standard limonin (Sigma). FIG. 9 is an HPLC pattern obtained with bitter orange juice; the limonin peak is indicated in this Figure. FIG. 10 is an HPLC pattern obtained with debittered orange juice prepared as described in Example 7, above; this pattern indicates the absence of limonin in the debittered orange juice. FIG. 11 shows an HPLC pattern obtained with standard preparations (20 ppm, 10 ppm, and 5 ppm) of limonin dissolved in 100% acetonitrile.

The results indicated that with axial or RFC columns packed with AMBERLITE® XAD-16 with particle sizes of 100–200$\mu$ removed more than 95% of the limonin present in the starting juice, regardless of the dissolved solid concentration (4.8 to 20°Brix) or limonin concentration (20 to 27 ppm), when up to 36 BV of starting juice was passed through the columns.

TABLE 2

Changes in Brix and Limonin Concentration During Debittering of Orange Juice

| | Juice | | | |
|---|---|---|---|---|
| | Brix (°) | | Limonin (ppm) | |
| Column | Bitter | Debittered | Bitter | Debittered |
| Axial Column* | 20.00 | 19.50 | 20.00 | 0.00 |
| RFC Column** | 15.60 | 15.20 | 27.00 | 1.20 |
| RFC Column*** | 4.80 | 4.80 | 25.00 | 0.10 |

*The axial column (33 ml) flow rate was 0.25 BV/min., and 16 BV juice from naval orange concentrate was debittered and pooled.
**This RFC (250 ml) flow rate was 0.5 BV/min., and 16 BV juice from Valencia pulp wash concentrate was debittered and pooled.
***This RFC (250 ml) flow rate was 0.5 BV/min., and 36 BV naval orange juice was debittered and pooled Samples from each run were also tested for their bitterness by a panel of six tasters. No bitter tastes were detected in samples pooled from 1–16 BV or 1–36 BV of debittered juice.

Figure 12:
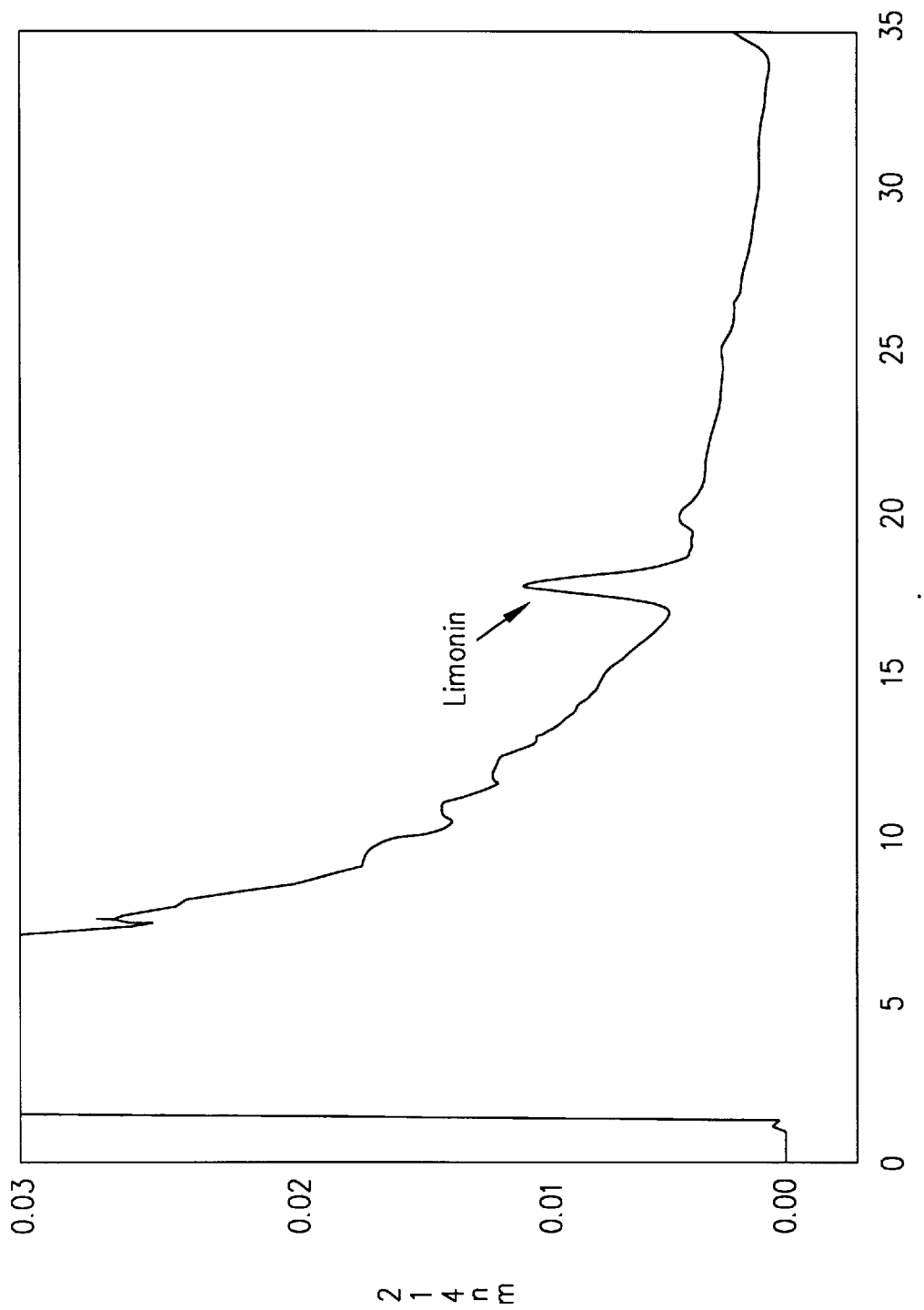
FIG. 12 shows an HPLC pattern obtained with bitterness compounds eluted with ethanol.

Bitter compounds (primarily limonin) were eluted from the axial and RFC columns using 95% ethanol. The column was then washed with water (1 CV), and the flavor compounds were eluted as described below. The column was then washed with water to remove ethanol. Flavor compounds (e.g., citrus flavor) were eluted from the columns using 0.5 M NaOH. The compounds in the ethanol fractions were concentrated using a rotary evaporator, and the ethanol was recovered as described in Example 2, above. Also as described in Example 2 above, the recovered ethanol was then used in the next cycle to elute bitter compounds from the columns. FIG. 12 shows an HPLC pattern obtained with bitterness compounds eluted from a column with ethanol. As indicated in this Figure, there is a distinct limonin peak.

Following the elution of the bitterness and flavor compounds, the columns were cleaned and regenerated as outlined in FIG. 13. The flavor compounds were then maintained at 4° until used. This cleaning and regeneration allowed the repeated use of the columns for debittering orange juice, as well as the isolation of bitter/flavor compounds from the columns.

EXAMPLE 9

Debittering and Deacidification of Grapefruit Juice

In this Example, methods for debittering and deacidifying grapefruit juice in a single step are described. These methods involve the use of modified adsorbents or ion-exchange resins.

Various resins were tested in this Example, including AMBERLITE®IRA-93 (Rohm and Haas), DOWEX®WGR-2 (Dow), DUOLITE®A-7 (Rohm and Haas), and AMBERLITE® XAD-16.

AMBERLITE®IRA-93 is a macroreticular, weakly basic anion exchange resin that contains tertiary amine functionality on a styrene-divinylbenzene matrix with a particle size of 16–50 mesh (300–1200 μm). The resin is available as a free base; its ion-exchange capacity is approximately 1.2 meq/ml (4.2 meq/g). DOWEX® WGR-2 is a macroporous, weak anion exchange resin containing polyamine functionality on a epichlorohydrin-ammonia matrix, with a particle size of 20–50 mesh (300–800 μm). The resin is available as a free base; its ion-exchange capacity is approximately 1.9 meq/ml (6.1 meq/g). DUOLITE® A-7 is a macroporous, weak anion exchange resin containing secondary amine functionality on a cross-linked formaldehyde matrix, with a particle size of 16–50 mesh (300–1200 μm). AMBERLITE®XAD-16 (Rohm and Haas) is a non-ionic hydrophobic cross-linked polystyrene divinyl benzene matrix, with a particle size of 16–50 mesh (300–1200 μm). The AMBERLITE®IRA-93, DOWEX® WGR-2, and DUOLITE® A-7 meet the requirements of FDA Food Additive Regulation 21 CFR 173.25. AMBERLITE®XAD-16 has been approved for removal of organic substances from aqueous food under 21 CFR 173.65.

As in previous Examples, the resins used in this example were dehydrated for 16 hours at 60° C., and then ground. In this Example, the resins were ground either in a coffee grinder, as described in Example 1, above, or, for large scale grinding (e.g., over 1 kg) a Laboratory Grinding Mill Model 4E (Straub Co., Warminster, Pa.) was used. Different particle sizes, ranging from 38 to 200μ were separated into discrete groups using a standard molecular sieve (VWR), as described in Example 1, above.

Aliquots of the ground resins with particle sizes of 100–200μ (i.e., in all of the experiments in this Example, the resin particles used were 100–200μ in size), were separately packed into RFC columns (250 ml bed volume). After packing the columns, the AMBERLITE®IRA-93, DOWEX® WGR-2, and DUOLITE® A-7 were preconditioned by passing two BVs 0.5 M NaOH, 2 BVs distilled water, two BVs 0.2 M HCl, and five BVs distilled water through the columns. The AMBERLITE®XAD-16 column was preconditioned by passing two BVs 95% ethanol, followed by two BVs distilled water, 0.5 M NaOH, two BVs of distilled water, two BVs 0.2 M HCl, and five BVs distilled water through the column. After each cycle of juice processing, the columns were reconditioned using the conditions described above.

Columns packed with ground AMBERLITE®IRA-93, DOWEX® WGR-2, and DUOLITE® A-7 were used for deacidification of grapefruit juice, while the column packed with AMBERLITE®XAD-16 was used to debitter the juice.

In one experiment, ground AMBERLITE®XAD-16 and DUOLITE® A-7 columns were connected together in order to allow "simultaneous" debittering and deacidification of grapefruit juice in a single process. The outlet of the ground AMBERLITE®XAD-16 column was connected to the inlet of the ground DUOLITE® A-7 column. The juice was first passed through the inlet of the AMBERLITE®XAD-16 column, and then the debittered effluent from the AMBERLITE®XAD-16 column was passed through the inlet of the DUOLITE® A-7 column for deacidification. As the columns were connected together, the juice eluted from the outlet of the DUOLITE® A-7 column was both debittered and deacidified.

Concentrated bitter and tart grapefruit juices (58° Brix) were obtained from the Florida Department of Citrus (Lake Alfred, Fla.). The concentrated juice was diluted with distilled water (15–25° Brix for debittering and deacidification), and centrifuged at 10,000 rpm (14,940×g) for 30 minutes at 15° C. to remove insoluble solids. The supernatant was then passed through the columns packed with various resins, as described above, at a flow rate of 0.5 BV/minute.

In the experiments with debittering and deacidification in one step, the concentrated bitter and tart grapefruit juice (58° Brix) was diluted with distilled water (15–25°Brix), centrifuged at 10,000 rpm (14,940×g) for 30 minutes to remove insoluble solids, and passed through AMBERLITE®XAD-16 and DUOLITE® A-7 columns connected in series. Debittered and deacidified juices were collected for analysis. Tests were conducted on various pools as indicated in Tables 3 to 5 (i.e., a pool of deacidified juice in which various BVs were represented). For example, in set of experiments, the juice obtained from 1–4 BVs were pooled and tested, as was juice from 5–8, 9–12, 13–16, 17–18, and 1–18 BVs.

Bitter and tart juice, debittered juice, deacidified juice, debittered and deacidified juice were analyzed for soluble solids (Brix) using a hand refractometer, as described in Example 8, above. The naringin content of the samples was analyzed, as described in Example 4, above. In the naringin analyses, the standard curve was linear within the range of 10–30 ppm naringin, and the absorbance at 284 nm was between 0.304 and 0.905. In these analyses, a Shimadzu UV-VIS spectrophotometer (Model UV-1201) was used.

In addition, the acid content of some samples was analyzed using a standard titration method. Briefly, test samples of untreated grapefruit juice and deacidified juice were tested by mixing 10 ml of juice with 40 ml deionized water and 4 drops of phenolphthalein (0.5% solution in 50% ethanol). The mixture was then titrated with NaOH solution, and the acid content was calculated as a percentage of citric acid.

The vitamin C content of the sample juices was also analyzed as described in Example 5. The vitamin C concentration of untreated grapefruit juice was approximately 125 ml/100 ml, while the vitamin C concentration of most of the grapefruit juice samples debittered or deacidified according to the methods described above, was approximately 112 mg/100 ml juice, regardless of the resin tested. Thus, the approximate decrease in vitamin C content was approximately 10%. This represents a loss of vitamin C that was less than the loss obtained by others (See e.g., Couture and Rouseff, J. Food Sci., 57:380–384 [1992], who reported a loss of 18–27% total vitamin C).

Among the deacidification resins tested in the present Example, DUOLITE® A-7 showed a higher deacidification capacity than AMBERLITE® IRA-93 or DOWEX® WGR- 2. AMBERLITE® IRA-93 and DOWEX® WGR-2 were able to reduce the acidity of grapefruit juice by about 18%, whereas under similar conditions, DUOLITE® A-7 can reduce the acidity by 26%. The following Tables provide a summary of the data obtained. As indicated in Table 3, for the AMBERLITE® IRA-93 column, approximately 18% of the acid was reduced and the Brix/acid ratio was increased from 8.72 (tart juice) to 10.0 (1–18 BV pool). As indicated in Table 4, about 18% of the acid was reduced and the Brix/acid ratio was increased from 8.68 (tart juice) to 10.08 (1–18 BV pool) for the DOWEX® WGR-2 column. As indicated in Table 5, about 26% of the acid was reduced and the Brix/acid ratio was increased from 8.5 (tart juice) to 11.1 (1–18 BV pool). As indicated in Table 6, about 52% of the acid was reduced and the Brix/acid ratio was increased from 8.8 (bitter and tart juice) to 16.75 (1–16 BV pool). In addition, the naringin concentration was decreased from 2,263 ppm (bitter and tart juice) to 283 ppm (1–16 BV pool). Grapefruit juice with a Brix/acid ratio greater than 15 is generally regarded in the art as being a reduced acid juice. Extensive removal of citric acid allows the consumption of the juice by some patients with gastric disturbances. Thus, deacidification of citrus juice is desirable in some settings.

TABLE 3

Deacidification of Grapefruit Juice Using AMBERLITE® IRA-93

| Fractions | °Brix | Citric Acid (%) | Brix/Acid Ratio |
|---|---|---|---|
| Tart Juice | 24.6 | 2.82 | 8.72 |
| Pooled Deacidified Juice (1–4 BV) | 21.4 | 1.31 | 16.34 |
| Pooled Deacidified Juice (5–8 BV) | 23.8 | 2.34 | 10.17 |
| Pooled Deacidified Juice (9–12 BV) | 24.2 | 2.62 | 9.24 |
| Pooled Deacidified Juice (13–16 BV) | 24.2 | 2.78 | 8.71 |
| Pooled Deacidified Juice (17–18 BV) | 23.0 | 2.72 | 8.46 |
| Pooled Deacidified Juice (1–18 BV) | 23.0 | 2.30 | 10.0 |

TABLE 4

Deacidification of Grapefruit Juice Using DOWEX® WGR-2

| Fractions | °Brix | Citric Acid (%) | Brix/Acid Ratio |
|---|---|---|---|
| Tart Juice | 25.0 | 2.88 | 8.68 |
| Pooled Deacidified Juice (1–4 BV) | 21.8 | 1.34 | 16.27 |
| Pooled Deacidified Juice (5–8 BV) | 23.9 | 2.24 | 10.67 |
| Pooled Deacidified Juice (9–12 BV) | 24.6 | 2.62 | 9.39 |
| Pooled Deacidified Juice (13–16 BV) | 24.6 | 2.78 | 8.85 |
| Pooled Deacidified Juice (17–18 BV) | 24.0 | 2.75 | 8.73 |
| Pooled Deacidified Juice (1–18 BV) | 23.9 | 2.37 | 10.08 |

TABLE 5

Deacidification of Grapefruit Juice Using DUOLITE® A-7

| Fractions | °Brix | Citric Acid (%) | Brix/Acid Ratio |
|---|---|---|---|
| Tart Juice | 25.0 | 2.94 | 8.50 |
| Pooled Deacidified Juice (1–4 BV) | 23.0 | 0.45 | 51.11 |
| Pooled Deacidified Juice (5–8 BV) | 24.6 | 2.27 | 10.83 |
| Pooled Deacidified Juice (9–12 BV) | 25.0 | 2.62 | 9.54 |
| Pooled Deacidified Juice (13–16 BV) | 25.0 | 2.69 | 9.30 |
| Pooled Deacidified Juice (17–18 BV) | 25.0 | 2.69 | 9.30 |
| Pooled Deacidified Juice (1–18 BV) | 24.2 | 2.18 | 11.10 |

In a single-step debittering and deacidification process with AMBERLITE® XAD-16 and DUOLITE® A-7 columns, the acid content of the grapefruit juice (14.6° Brix) was reduced from 1.66% to 0.80%, and the naringin content was reduced from 2263 ppm to 283 ppm, when 16 BVs of juice was passed through the columns. The Brix/acid ratio of the juice was also increased, from 8.80 (tart juice) to 16.75 (deacidified juice). Table 6 provides data obtained for this single-step process. As indicated in this Table, the results for some tests were higher in the 9–12 BV pool, compared to the 5–8 BV pool. Although an understanding of the mechanism is not required in order to practice the invention, initially the column binds some soluble solids which are eventually released from the column, producing the observed results.

TABLE 6

Debittering and Deacidification of Grapefruit Juice Using AMBERLITE® XAD-16 and DUOLITE® A-7

| Fractions | °Brix | Citric Acid (%) | Brix/Acid Ratio | Naringin (ppm) |
|---|---|---|---|---|
| Bitter and Tart Juice | 14.6 | 1.66 | 8.80 | 2,263 |
| Pooled Debittered and Deacidified Juice (1–4 BV) | 11.4 | 0.06 | 190.00 | 158 |
| Pooled Debittered and Deacidified Juice (5–8 BV) | 13.4 | 0.48 | 27.92 | 247 |
| Pooled Debittered and Deacidified Juice (9–12 BV) | 14.0 | 1.25 | 11.20 | 322 |
| Pooled Debittered and Deacidified Juice (13–16 BV) | 14.2 | 1.54 | 9.22 | 411 |
| Pooled Debittered and Deacidified Juice (1–16 BV) | 13.4 | 0.80 | 16.75 | 283 |

In addition to the above advantages, the juice was processed much more rapidly than is possible using existing processes (Couture and Rouseff, J. Food Sci., 75:380–384 [1992]; and Johnson and Chandler, Food Technol., May 130–137 [1988]), as the particle size of the resins (100–200µ) were optimized for the present invention. Particle sizes of the resins reported to date for debittering or deacidification of citrus juice are larger than 300µ, which limits their ability to process juice at high flow rates. In preferred embodiments, the single-step debittering and deacidification process utilizes AMBERLITE®XAD-16 and DUOLITE® A-7 resins with particle sizes of 100–200µ.

It is clear that the present invention as described above and exemplified in the Examples above, provides much improved methods for deacidifying and debittering fluids, in particular juices. It is not intended that the present invention be limited to a particular juice. Indeed, it is intended that the present invention be used with all citrus juices, as well as any other juice which contains at least one compound that renders the juice bitter and/or acidic.

It is not intended that the present invention be limited to these particular embodiments. All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in food production, separation science, chromatography, and/or related fields are intended to be within the scope of the following claims.

We claim:

1. A method for isolating flavor compounds from a fluid, comprising the steps of:
   a) providing:
      i) a fluid suspected of containing one or more flavor compounds, and
      ii) an adsorbent styrene-divinyl-benzene resin, wherein said adsorbent styrene-divinyl-benzene resin is comprised of particles of about 100–200 microns; and
   b) contacting said adsorbent styrene-divinyl-benzene resin with said fluid.

2. The method of claim 1, wherein said contacting is conducted under conditions in which said one or more flavor compounds is substantially removed from said fluid.

3. The method of claim 1, wherein said adsorbent styrene-divinyl-benzene resin comprises a non-ionic, hydrophobic, cross-linked resin.

4. The method of claim 1, wherein said flavor compound is citrus flavor.

5. A method for the debittering and isolating flavor compounds from a fluid comprising the steps of:
   a) providing:
      i) a fluid suspected of containing one or more bitterness compounds and flavor compounds, and
      ii) an adsorbent styrene-divinyl-benzene resin, wherein said adsorbent styrene-divinyl-benzene resin is comprised of particles of about 100–200 microns;
   b) contacting said adsorbent styrene-divinyl-benzene resin with said fluid, under conditions such that said bitterness compounds and said flavor compounds adsorb to said styrene-divinyl-benzene resin;
   c) eluting said bitterness compounds adsorbed to said styrene-divinyl-benzene resin with a buffer; and
   d) eluting said flavor compounds adsorbed to said styrene-divinyl-benzene resin with a buffer.

6. The method of claim 5, further comprising the step of collecting said eluted bitterness compounds.

7. The method of claim 5, further comprising the step of collecting said eluted flavor compounds.

8. The method of claim 5, wherein said bitterness compounds are eluted from said styrene-divinyl-benzene resin using a buffer comprising ethanol.

9. The method of claim 8, wherein said ethanol is removed from said bitterness compounds, to produce recovered ethanol.

10. The buffer of claim 9, wherein said recovered ethanol is suitable for use as a buffer.

11. The method of claim 5, wherein said flavor compounds are eluted from said styrene-divinyl-benzene resin using a buffer comprising sodium hydroxide.

12. Flavor compounds prepared according to the method of claim 5.

13. Bitterness compounds prepared according to the method of claim 5.

14. A method of debittering and deacidifying a fluid comprising the steps of:
   a) providing:
      i) a fluid suspected of containing one or more bitterness compounds, one or more acid compounds,
      ii) an adsorbent styrene-divinyl-benzene resin, wherein said adsorbent styrene-divinyl-benzene resin is comprised of particles of about 100–200 microns, and
      iii) an anion exchange resin;
   b) contacting said adsorbent styrene-divinyl-benzene resin with said fluid under conditions such that said one or more bitterness compounds adsorb said adsorbent styrene-divinyl-benzene resin, and said one or more acid compounds pass through said adsorbent styrene-divinyl-benzene resin to produce a debittered fluid;
   c) contacting said debittered fluid with said macroporous anion exchange resin under conditions such that said one or more acid compounds adsorb to said anion exchange resin to produce a debittered and deacidified fluid.

15. The method of claim 14, wherein said one or more bitterness compounds adsorbed to said adsorbent styrene-divinyl-benzene resin are eluted.

16. The method of claim 14, wherein said one or more acid compounds are adsorbed to anion exchange resin are eluted.

17. The method of claim 14, wherein said anion exchange resin comprises a macroporous anion exchange resin having secondary amine functionality and a cross-linked formaldehyde matrix.

18. The method of claim 14, wherein said anion exchange resin comprises a macroreticular anion exchange resin having tertiary amine functionality and a styrene-divinyl-benzene matrix.

19. The method of claim 14, wherein said adsorbent styrene-divinyl-benzene resin comprises a non-ionic, hydrophobic, cross-linked resin.

20. A debittered and deacidified fluid prepared according to the method of claim 14.

21. The method of claim 14, wherein said fluid is citrus juice.

22. The method of claim 21, wherein said citrus juice is selected from the group consisting of grapefruit juice, orange juice, tangerine juice, lemon juice, and lime juice.

23. A composition comprising one or more bitterness compounds prepared according to the following steps:
   a) providing:
      i) a fluid suspected of containing one or more bitterness compounds, and
      ii) an adsorbent styrene-divinyl-benzene resin, wherein said adsorbent styrene-divinyl-benzene resin is comprised of particles of about 100–200 microns; and
   b) contacting said adsorbent styrene-divinyl-benzene resin with said fluid under conditions such that said one or more bitterness compounds adsorbs to said adsorbent styrene-divinyl-benzene resin;

c) eluting said one or more bitterness compounds adsorbed to said adsorbent styrene-divinyl-benzene resin; and d) collecting said one or more bitterness compounds.

24. The bitterness compound of claim 23, wherein said adsorbent styrene-divinyl-benzene resin comprises a non-ionic, hydrophobic, cross-linked resin.

25. The bitterness compound of claim 23, wherein said bitterness compound is selected from the group consisting of limonin and naringin.

26. The bitterness compound of claim 23, wherein said adsorbent styrene-divinyl-benzene resin is contained within a radial flow column.

27. The bitterness compound of claim 23, wherein said fluid is citrus juice.

28. The bitterness compound of claim 27, wherein said citrus juice is selected from the group consisting of grapefruit juice, orange juice, tangerine juice, lemon juice, and lime juice.

* * * * *